United States Patent
Kim et al.

(10) Patent No.: US 10,078,793 B2
(45) Date of Patent: Sep. 18, 2018

(54) METHOD AND DEVICE FOR DISPLAYING IMAGE

(71) Applicant: SAMSUNG ELECTRONICS CO., LTD., Suwon-si (KR)

(72) Inventors: Dae-hee Kim, Suwon-si (KR); Woong-il Choi, Osan-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 42 days.

(21) Appl. No.: 15/166,719

(22) Filed: May 27, 2016

(65) Prior Publication Data

US 2016/0350932 A1 Dec. 1, 2016

(30) Foreign Application Priority Data

May 29, 2015 (KR) .................... 10-2015-0076484

(51) Int. Cl.
G06K 9/00 (2006.01)
G06K 9/46 (2006.01)
G06K 9/32 (2006.01)

(52) U.S. Cl.
CPC ....... G06K 9/4671 (2013.01); G06K 9/00228 (2013.01); G06K 9/3233 (2013.01); G06K 9/4642 (2013.01)

(58) Field of Classification Search
CPC .............. G06K 9/4671; G06K 9/4642; G06K 9/00228; G06K 9/3233
See application file for complete search history.

(56) References Cited

U.S. PATENT DOCUMENTS

| 8,218,895 | B1* | 7/2012 | Gleicher | G06T 3/0025 345/427 |
| 8,363,984 | B1* | 1/2013 | Goldman | G06T 3/0012 382/298 |
| 9,070,182 | B1* | 6/2015 | Chua | G06T 3/0012 |
| 9,607,235 | B2* | 3/2017 | Chedeau | G06K 9/3233 |
| 2009/0251594 | A1* | 10/2009 | Hua | G06T 11/00 348/441 |
| 2010/0060915 | A1* | 3/2010 | Suzuki | G06K 9/00684 358/1.9 |
| 2010/0321381 | A1* | 12/2010 | Lee | G06T 15/20 345/419 |

(Continued)

FOREIGN PATENT DOCUMENTS

| JP | 2008-059534 A | 3/2008 |
| JP | 2014-215604 A | 11/2014 |

OTHER PUBLICATIONS

Communication dated Dec. 15, 2016, issued by the Korean Intellectual Property Office in counterpart Korean Application No. 10-2015-0076484.

(Continued)

*Primary Examiner* — Aaron W Carter
(74) *Attorney, Agent, or Firm* — Sughrue Mion, PLLC

(57) ABSTRACT

A method and device for displaying an image are provided. The method includes acquiring block importance values of a plurality of blocks corresponding to an image, determining a reference region including at least one block among the plurality of blocks based on the acquired block importance values and a predetermined reference, determining a main region that includes the reference region and has a predetermined shape and a predetermined size, based on the block importance values, and displaying a portion of the image corresponding to the main region.

27 Claims, 17 Drawing Sheets

(56) References Cited

U.S. PATENT DOCUMENTS

| | | | |
|---|---|---|---|
| 2010/0329550 A1* | 12/2010 | Cheatle | G06T 11/60 382/165 |
| 2010/0329588 A1* | 12/2010 | Cheatle | G06K 9/00234 382/298 |
| 2011/0200273 A1* | 8/2011 | Singhal | G06K 9/3233 382/284 |
| 2012/0086723 A1* | 4/2012 | Fairfield | G09G 5/36 345/620 |
| 2012/0106859 A1 | 5/2012 | Cheatle | |
| 2012/0257830 A1 | 10/2012 | Tian et al. | |
| 2013/0084013 A1* | 4/2013 | Tang | G06K 9/4671 382/195 |
| 2013/0147845 A1* | 6/2013 | Xie | G06F 3/14 345/660 |
| 2013/0176333 A1* | 7/2013 | Agar | H04N 1/00167 345/629 |
| 2014/0055484 A1* | 2/2014 | Moon | G06T 11/001 345/593 |
| 2014/0184726 A1* | 7/2014 | Kim | H04N 7/147 348/14.07 |
| 2014/0270533 A1* | 9/2014 | Chedeau | G06K 9/3233 382/195 |
| 2014/0301653 A1* | 10/2014 | Murphy-Chutorian | G06K 9/00221 382/224 |
| 2014/0320534 A1 | 10/2014 | Kimura | |
| 2016/0117798 A1* | 4/2016 | Lin | G06T 3/40 345/667 |
| 2016/0180188 A1* | 6/2016 | Duan | G06K 9/4671 385/154 |
| 2016/0350932 A1* | 12/2016 | Kim | G06K 9/4671 |

OTHER PUBLICATIONS

Communication from the Korean Intellectual Property Office dated Apr. 26, 2016 in counterpart Korean Application No. 10-2015-0076484.

* cited by examiner

METHOD AND DEVICE FOR DISPLAYING IMAGE

CROSS-REFERENCE TO RELATED APPLICATION

This application claims priority from Korean Patent Application No. 10-2015-0076484, filed on May 29, 2015, in the Korean Intellectual Property Office, the disclosure of which is incorporated herein by reference in its entirety.

BACKGROUND

1. Field

Apparatuses and methods consistent with exemplary embodiments relate to a method and device for displaying an image, and more particularly, to a method and device for recognizing and displaying a main portion of an image.

2. Description of the Related Art

With the advancement of electronic devices such as digital cameras, camcorders, smartphones, etc., users may more easily and conveniently capture and manage a digital image. Users may directly capture an image by using an electronic device for themselves or manage images received through the Internet and/or the like by using an electronic device.

However, when a plurality of images are displayed in an electronic device, sizes of the plurality of images are reduced and displayed. As a size of an image is reduced, a larger number of images are displayed in a display of an electronic device at one time, but it is difficult for a user to check content included in a corresponding image. Also, as a size of an image is reduced, content emphasized by a user in a corresponding image cannot be effectively emphasized.

Therefore, technology for effectively displaying an image in an electronic device may be useful.

SUMMARY

Provided are a method and device for recognizing and displaying a main portion of an image.

According to an aspect of an exemplary embodiment, there is provided an image display method performed by an electronic device including: acquiring block importance values of a plurality of blocks corresponding to an image; determining a reference region including at least one block among the plurality of blocks based on the acquired block importance values and a predetermined reference; determining a main region that includes the reference region and has a predetermined shape and a predetermined size, based on the block importance values; and displaying a portion of the image corresponding to the main region.

The acquiring the block importance values may include generating an importance map corresponding to the image based on the block importance values, wherein the reference region may be determined in the importance map based on the block importance values and the predetermined reference, and wherein the main region may be determined in the importance map based on the block importance values.

Each of the block importance values may be acquired based on an amount of detail of a corresponding block among the plurality of blocks.

The amount of detail may be determined based on weight values of points in the image based on a composition of the image.

Weight values of a plurality of intersection points in the image, where a plurality of virtual vertical lines that horizontally divide the image intersect a plurality of virtual horizontal lines that vertically divide the image, may be higher than weight values of other points in the image.

Weight values of points included among the intersection points may be equal.

A weight value of a center point in the image may be higher than a weight value of other points in the image.

The acquiring the block importance values may include recognizing a face in the image, and wherein a block importance value of a portion in which the face is recognized in the image may be higher than a block importance value of a portion in which the face is not recognized in the image.

A block importance value of the at least one block included in the reference region may be higher than the block importance values of the blocks that are not included in the reference region.

The determining the reference region may include recognizing a face in the image, and wherein the reference region may include at least one block corresponding to a portion in which the face is recognized in the image.

The determining the main region may include: enlarging the determined reference region based on the block importance values; determining whether the enlarged reference region covers the main region; and in response to determining that the enlarged reference region covers the main region, determining the main region in the enlarged reference region.

The main region may be preset to have a rectangular shape, and wherein the determining whether the enlarged reference region covers the main region may include comparing a width and a height of the enlarged reference region with a width and a height of the main region.

A portion of the image corresponding to the main region may be displayed on an electronic album, and wherein a width of the main region may be preset based on at least one selected from a ratio of a width of the image to a width of a cell constituting the electronic album and a ratio of a height of the image of to a height of the cell constituting the electronic album.

When a maximum width of the main region is equal to a width of the image, the reference region may be determined to have the same width as the maximum width of the main region, and wherein the determined reference region may be enlarged in a horizontal direction based on the block importance values.

A portion of the image corresponding to the main region may be displayed on an electronic album, and wherein a height of the main region may be preset based on at least one selected from a ratio of a width of the image to a width of a cell constituting the electronic album and a ratio of a height of the image of to a height of the cell constituting the electronic album.

When a maximum height of the main region is equal to a height of the image, the reference region may be determined to have the same height as the maximum height of the main region, and wherein the determined reference region may be enlarged in a vertical direction based on the block importance values.

A portion of the image corresponding to the main region may be displayed on an electronic album, and wherein the main region may be preset to have a shape that is congruent to a shape of a cell constituting the electronic album.

The portion of the image corresponding to the main region may be enlarged or reduced to fit the cell.

According to an aspect of another exemplary embodiment, there is provided an electronic device for displaying an image, the electronic device including: at least one processor configured to acquire block importance values of a plurality of blocks corresponding to an image, determine a reference region including at least one block among the plurality of blocks based on the acquired block importance values and a predetermined reference, and determine a main region that includes the reference region and has a predetermined shape and a predetermined size, based on the block importance values; and a display configured to display a portion of the image corresponding to the main region.

The at least one processor may be further configured to generate an importance map corresponding to the image, based on the block importance values, wherein the reference region may be determined in the importance map, based on the block importance values and the predetermined reference, and wherein the main region may be determined in the importance map, based on the block importance values.

Each of the block importance values may be acquired based on an amount of detail of a corresponding block among the plurality of blocks.

The at least one processor may be further configured to recognize a face in the image, and wherein a block importance value of a portion in which the face is recognized in the image may be higher than a block importance value of a portion in which the face is not recognized in the image.

A block importance value of the at least one block included in the reference region may be higher than the block importance values of the blocks that are not included in the reference region.

The at least one processor may be further configured to recognize a face in the image, and wherein the reference region may include at least one block corresponding to a portion in which the face is recognized in the image.

The at least one processor may be further configured to enlarge the determined reference region based on the block importance values, determine whether the enlarged reference region covers the main region, and determine the main region in the enlarged reference region in response to determining that the enlarged reference region covers the main region.

A portion of the image corresponding to the main region may be displayed on an electronic album, and wherein the main region may be preset to have a shape that is congruent to a shape of a cell constituting the electronic album.

According to an aspect of another exemplary embodiment, there is provided a non-transitory computer-readable recording medium having recorded thereon a program for executing, by a computer, an image display method.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Figure 1:
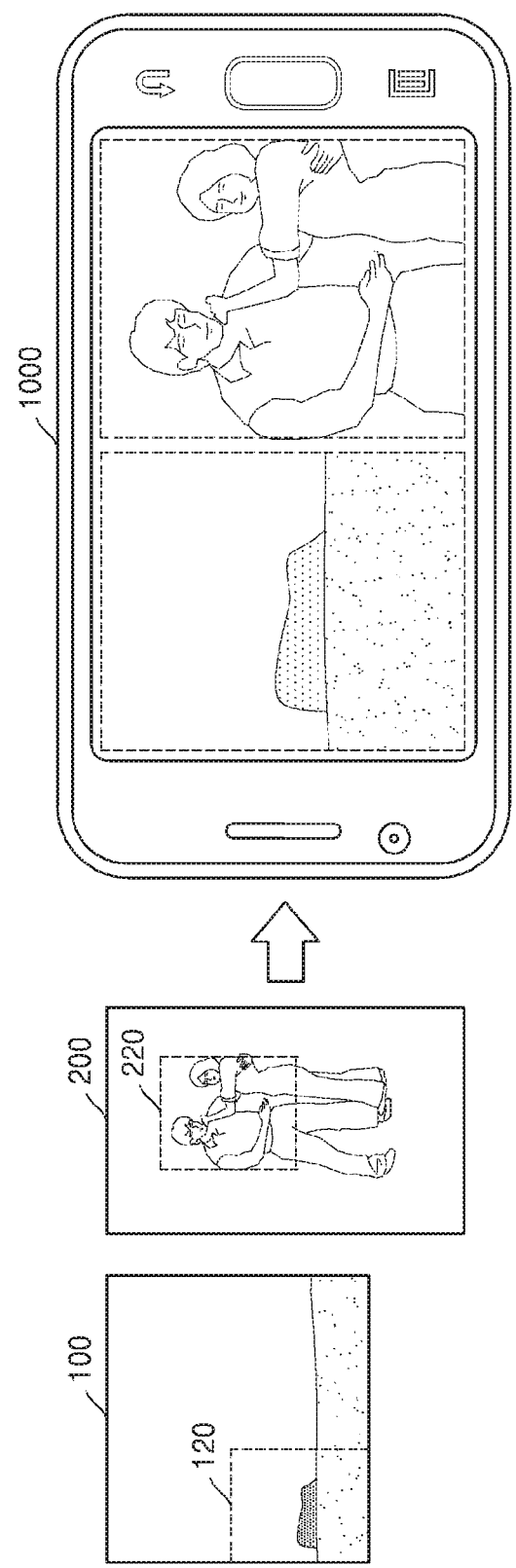
FIG. 1 is a diagram illustrating an example of displaying a plurality of images in an electronic device, according to an exemplary embodiment.

Reference will now be made in detail to exemplary embodiments, examples of which are illustrated in the accompanying drawings, wherein like reference numerals refer to like elements throughout. In this regard, the exemplary embodiments may have different forms and should not be construed as being limited to the descriptions set forth herein. Accordingly, the exemplary embodiments are merely described below, by referring to the figures, to explain aspects. As used herein, the term "and/or" includes any and all combinations of one or more of the associated listed items.

Below, exemplary embodiments will be described in detail with reference to the accompanying drawings. Aspects of exemplary embodiments may, however, include many different forms and should not be construed as being limited to the exemplary embodiments set forth herein. Moreover, like reference numerals refer to like elements throughout.

Terms used have been selected as general terms which are widely used, but may be altered according to the intent of an operator of ordinary skill in the art, conventional practice, or introduction of new technology. Also, if there is a term which is selected by the applicant in a specific case, a meaning of the term will be described in detail in a corresponding description. Therefore, the terms should be defined on the basis of the entire content of this specification instead of a simple name of each of the terms.

The terms of a singular form may include plural forms unless referred to the contrary. The meaning of 'comprise', 'include', or 'have' specifies a property, a region, a fixed number, a step, a process, an element and/or a component but does not exclude other properties, regions, fixed numbers, steps, processes, elements and/or components. Particularly, numbers described herein are examples for helping understanding, and the present disclosure should not be limited by the numbers described herein.

In this disclosure below, when it is described that something comprises (or includes or has) some elements, it should be understood that it may comprise (or include or have) only those elements, or it may comprise (or include or have) other elements as well as those elements if there is no specific limitation. Moreover, each of terms such as " . . . unit", " . . . apparatus" and "module" described in this specification denotes an element for performing at least one function or operation, and may be implemented in hardware, software or a combination of hardware and software.

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element. Therefore, a first element described below may be a second element according to an exemplary embodiment.

Below, terms used herein will be briefly described.

A block of an image described herein is a virtual unit that divides an image, and a size of the block may be predetermined by a device or may be arbitrarily determined by a user. The size of the block may be equal to that of one pixel or may be larger than that of at least one pixel. A shape of the block may be implemented in a polygonal shape such as a square shape, a rectangular shape, or the like.

An electronic album described herein denotes a graphic user interface (GUI) where a plurality of images are arranged at an arbitrary position or a predetermined position by a device. The electronic album may be implemented so that a user arbitrarily arranges an image or changes a shape or a size of the image arranged in the electronic album. Also, the electronic album may be implemented so that the device autonomously arranges an image in the electronic album or changes a shape or a size of the image arranged in the electronic album.

FIG. 1 is a diagram illustrating an example of displaying a plurality of images in an electronic device, according to an exemplary embodiment.

Referring to FIG. 1, when displaying a plurality of images 100 and 200 in an electronic device 1000, the electronic device 1000 may display main portions 120 and 220 of the images 100 and 200 on a screen. An image may be generated by directly photographing a landscape, a thing, a person, and/or the like, or may be processed by a graphic editing program or the like.

The electronic device 1000 may be a smartphone, a tablet personal computer (PC), a PC, a smart television (TV), a portable terminal, a personal digital assistant (PDA), a laptop computer, a media player, a micro server, a global positioning system (GPS) device, an e-book terminal, a digital broadcast terminal, a navigation, a kiosk, an MP3 player, a digital camera, a mobile computing device, a immobile computing device, or the like, but is not limited thereto.

Figure 2:
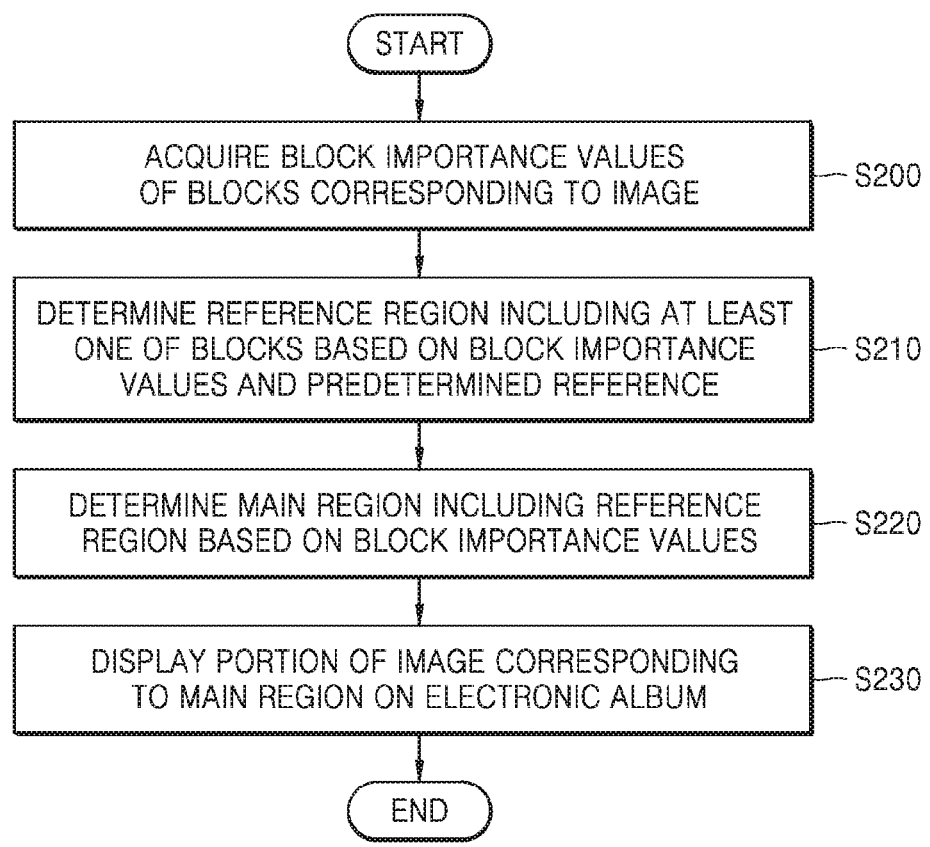
FIG. 2 is a flowchart of a method of displaying an image in an electronic device, according to an exemplary embodiment.

FIG. 2 is a flowchart of a method of displaying an image in an electronic device, according to an exemplary embodiment.

In operation S200, the electronic device 1000 may acquire block importance values of a plurality of blocks corresponding to an image.

An image may be divided into a plurality of blocks, and sizes or shapes of the blocks may be variously implemented. For example, the shapes of the blocks may be polygonal such as square, rectangular, or the like, or circular.

A block importance value is a parameter value used to calculate an importance of each of a plurality of blocks corresponding to an image. A plurality of blocks corresponding to a portion of an image to be emphasized may be implemented in order for the block importance value to have a relatively higher value.

For example, when a structure is included in an image, the structure may be a portion to be emphasized in the image, and when a person is included in an image, a face of the person may be a portion which is to be emphasized in the image.

Therefore, when a structure is included in an image, block importance values of a plurality of blocks corresponding to the structure may have relatively higher values. Also, when a person is included in an image, block importance values of a plurality of blocks corresponding to a face of the person may have relatively higher values.

According to an exemplary embodiment, the electronic device 1000 may acquire a block importance value, based on the amount of information of each of a plurality of blocks. Here, a block importance value of one block may be proportional to the amount of information of the one block, and the amount of information of a block may be calculated from a configuration and a probability distribution of a pixel constituting the block and may be referred to as entropy. The amount of information of a block where pieces of color information of pixels are aligned may be lower than the amount of information of a block where pieces of color information of pixels are not aligned.

For example, the amount of information of a block representing a single color in an image may be lower than the amount of information of a block representing a plurality of colors in the image. For example, when a boundary between objects is included in a block, the amount of information of the block may have a relatively higher value. Generally, when various objects are included in one block, the amount of information of the one block may have a relatively higher value.

According to an exemplary embodiment, the electronic device 1000 may acquire a block importance value, based on a weight value based on a composition of an image. Here, weight values of intersection points where virtual vertical lines that horizontally divides the image into three parts intersect virtual horizontal lines that vertically divides the image into three parts may have a higher value than a weight value of a point other than the intersection point. Here, the three parts may have the same dimensions.

According to an exemplary embodiment, the electronic device 1000 may recognize a face in an image, and a block importance value of a block corresponding to a portion of the image where the face is recognized may be higher than that of a block corresponding to a portion of the image where the face is not recognized.

In operation S210, the electronic device 1000 may determine a reference region including at least one of the plurality of blocks, based on a predetermined reference and the block importance values which are acquired in operation S200.

According to an exemplary embodiment, the electronic device 1000 may determine, as the reference region, a block having a highest block importance value among the plurality of blocks.

According to an exemplary embodiment, the electronic device 1000 may determine, as the reference region, the block having the highest block importance value among the plurality of blocks and one or more blocks having block importance values within a certain range from the highest block importance value. In this case, a shape of the reference region may be polygonal such as square, rectangular, or the like, or circular. According to an exemplary embodiment, the electronic device 1000 may determine, as the reference region, the block having the highest block importance value among the plurality of blocks and one or more blocks within a certain range from the block having the highest block importance value.

According to an exemplary embodiment, the electronic device 1000 may recognize a face in an image. In this case, a reference region may include at least one block corresponding to a portion where a face is recognized.

According to an exemplary embodiment, the electronic device 1000 may determine a reference region in consideration of the above-described references, but is not limited thereto. For example, a reference region may be determined in consideration of various references.

In operation S220, the electronic device 1000 may determine, based on the block importance values, a main region which includes the reference region determined through operation S220 and has a predetermined shape and size. A shape and a size of the main region may be predetermined by the electronic device 1000 or a user.

According to an exemplary embodiment, the electronic device 1000 may allow a block, having a relatively higher block importance value among peripheral blocks of the reference region, to be preferentially included into the main region.

In operation S230, the electronic device 1000 may display a portion corresponding to the main region which is determined in operation S220.

The determined main region may correspond to a certain portion of the image, and the electronic device 1000 may display the certain portion on an electronic album. Therefore, even when a plurality of images are displayed on the electronic album, the user may easily check content included in each of the plurality of images.

According to an exemplary embodiment, the electronic device 1000 may store the certain portion of the image corresponding to the determined main region separately from the image. In this case, a resolution of the certain portion may be lower than that of the image, and the certain portion may function as a thumbnail image of the image.

According to an exemplary embodiment, the electronic device 1000 may generate an importance map corresponding to the image based on the block importance values. Here, the importance map may have a plurality of regions respectively corresponding to the plurality of blocks corresponding to the image. In this case, the electronic device 1000 may map a block importance value of each of the blocks in a corresponding region of the importance map.

A size of each of regions of the importance map may be equal to or larger than that of one pixel. A shape of each region may be polygonal such as square, rectangular, or the like, or circular.

According to an exemplary embodiment, the electronic device 1000 may determine the reference region in the importance map, based on a block importance value and a predetermined reference.

According to an exemplary embodiment, the electronic device 1000 may determine the main region in the importance map, based on a block importance value.

Figure 3:
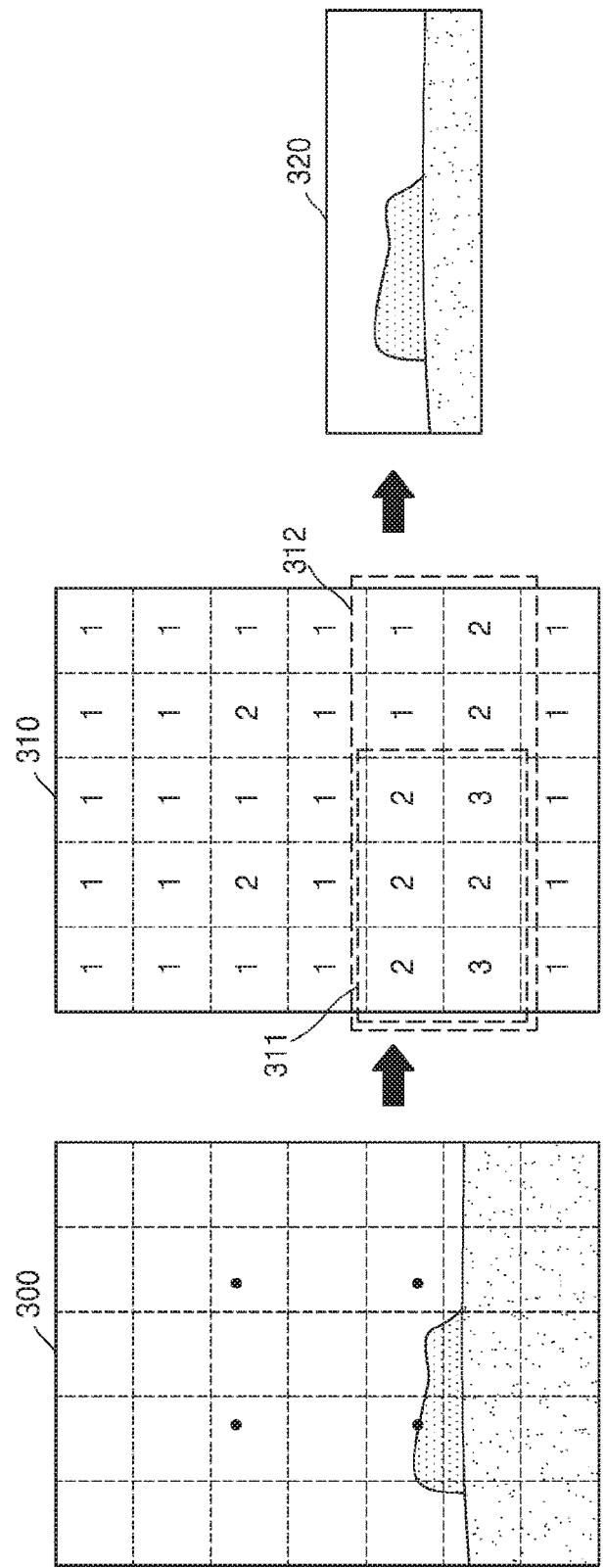
FIG. 3 is a diagram illustrating an example of determining a main region, according to an exemplary embodiment.

FIG. 3 is a diagram illustrating an example of determining a main region, according to an exemplary embodiment.

Referring to FIG. 3, an image 300 may be divided into a plurality of blocks having a square shape. In FIG. 3, a size of a block may be implemented to divide the image 300 into thirty-five equal parts, but a size or a shape of the block may be variously implemented. For example, the shape of the block may be polygonal such as rectangular or the like, or circular.

According to an exemplary embodiment, the electronic device 1000 may generate an importance map 310 corresponding to the image 300, based on a block importance value. Here, the importance map 310 may have a plurality of regions respectively corresponding to a plurality of blocks of the image 300. In this case, the electronic device 1000 may map a block importance value of each of the blocks in a corresponding region of the importance map 310.

According to an exemplary embodiment, the electronic device 1000 may acquire a block importance value, based on the amount of information of each of the plurality of blocks. Here, a block importance value of one block may be proportional to the amount of information of the one block. For example, when a boundary between objects is included in a block, the amount of information of the block may have a relatively higher value in comparison with other blocks which do not include any boundary.

For example, referring to FIG. 3, in the image 300, block importance values of blocks including a boundary between the sky and the sea, block importance values of blocks including a boundary between the sky and an island, and block importance values of blocks including a boundary between the sea and the island may be higher than block importance values of other blocks which do not include any boundary. Furthermore, block importance values of blocks including a boundary between three objects such as the sky, the sea, and the island may be higher than block importance values of blocks including only a boundary between two objects.

In FIG. 3, a block importance value included in the importance map 310 is expressed as a number, but may be expressed in various ways. For example, the block importance value may be graphically expressed in light or shade or in a gray scale.

According to an exemplary embodiment, the electronic device 1000 may determine, as a reference region, a block having the highest block importance value among a plurality of blocks and blocks having a block importance value within a predetermined range from the highest block importance value of the block among the plurality of blocks. In this case, a shape of the reference region may be polygonal such as square, rectangular, or the like, or circular. For example, referring to FIG. 3, in the importance map 310, two blocks having a highest block importance value "3" and blocks having a block importance value within a range "2" from the highest block importance values of the two blocks may be determined as a reference region 311 in the importance map 310.

A main region may have a predetermined shape and size and include the reference region 311. For example, when the main region is set to have a rectangular shape having a 5*2 size with respect to one block, and the reference region 311 is determined as having a rectangular shape having a 3*2 size with respect to one block as illustrated in FIG. 3, blocks 312 that include the reference region 311 and form a rectangular shape of the 5*2 size may be determined as a main region 312.

When the main region 312 is determined as illustrated in FIG. 3, a portion 320 of the image 300 corresponding to the main region 312 may be displayed on an electronic album.

Figure 4:
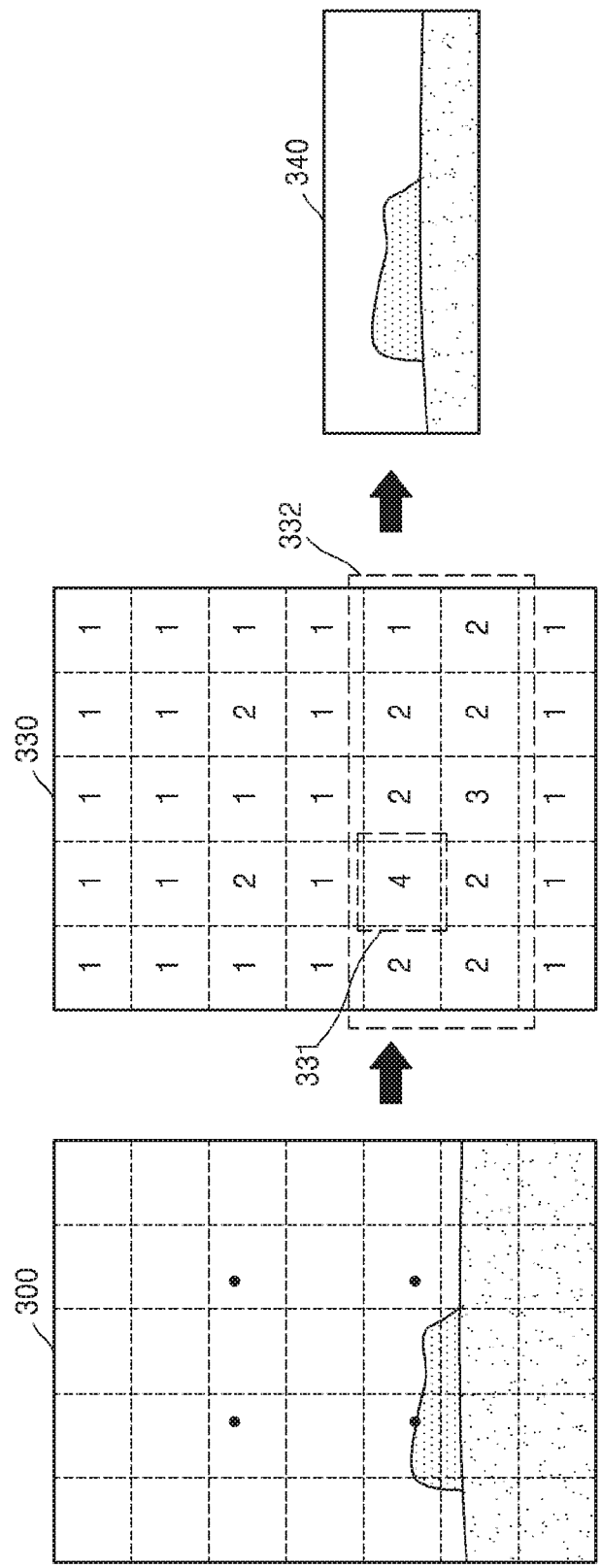
FIG. 4 is a diagram illustrating an example of determining a main region, according to another exemplary embodiment.

FIG. 4 is a diagram illustrating an example of determining a main region, according to another exemplary embodiment.

Referring to FIG. 4, an image 300 may be divided into a plurality of blocks having a square shape. In FIG. 4, a size of a block may be implemented to divide the image 300 into thirty-five equal parts, but a size or a shape of the block may be variously implemented. For example, the shape of the block may be polygonal such as rectangular or the like, or circular.

According to an exemplary embodiment, the electronic device 1000 may generate an importance map 330 corresponding to the image 300, based on a block importance value. Here, the importance map 330 may have a plurality of regions respectively corresponding to a plurality of blocks of the image 300. In this case, the electronic device 1000 may map a block importance value of each of the blocks in a corresponding region of the importance map 330.

According to an exemplary embodiment, the electronic device 1000 may acquire a block importance value, based on the amount of information of each of the plurality of blocks. Here, a block importance value of one block may be proportional to the amount of information of the one block. Furthermore, the electronic device 1000 may acquire a block importance value, based on a weight value based on a composition of an image.

Here, the composition of the image may denote a relative position of content which is to be emphasized by a user in an image. For example, the composition of the image may be based on the Rule of Thirds.

For example, when the user captures an image based on the Rule of Thirds, content to be emphasized may be located on a line, which horizontally divides the image into three parts, or a line which vertically divides the image into three parts. Also, the content to be emphasized may be located at an intersection point between of the line, which horizontally divides the image into three parts, and the line which vertically divides the image into three parts.

In consideration that content to be emphasized by the user in an image is located at a certain position in the image, the electronic device 1000 may acquire block importance values of a plurality of blocks corresponding to the image, based on a weight value based on a composition of the image.

For example, as illustrated in FIG. 4, block importance values of a plurality of blocks corresponding to the image 300 may be acquired based on a weight value based on the Rule of Thirds. Here, the weight value may be applied to a plurality of blocks corresponding to an intersection point where a virtual vertical line that horizontally divides the image 300 into three parts intersects a virtual horizontal line that vertically divides the image 300 into three parts.

Referring to FIG. 4, the weight value may be applied to the plurality of blocks corresponding to the intersection point where the virtual vertical line that horizontally divides the image 300 into three parts intersects the virtual horizontal line that vertically divides the image 300 into three parts, and thus, a block importance value of a block corresponding to the intersection point may have a relatively higher value. For example, referring to FIG. 4 and FIG. 3, a block importance value with the weight value applied thereto may be two times a value before the weight value is applied.

According to an exemplary embodiment, in an image, a weight value of the intersection point may be higher than that of a point other than the intersection point.

According to an exemplary embodiment, a weight value of points located on one of a plurality of virtual vertical lines may be equal, and a weight value of points located on one of a plurality of virtual horizontal lines may be equal.

According to an exemplary embodiment, in an image, a weight value of a center point may be higher than that of a point other than the center point.

According to an exemplary embodiment, a weight value may be a Gaussian weight value. In an image, a weight value of an intersection point where a virtual horizontal line intersects a virtual vertical line may be the highest, and a weight value may become lower as a position of a point in the image becomes farther away from the intersection point.

According to an exemplary embodiment, the electronic device 1000 may determine, as a reference region 331, a block having a highest block importance value among a plurality of blocks. Referring to FIG. 4, a block 331 of which a block importance value is 4 and is the highest may be determined as the reference region 331.

According to an exemplary embodiment, the electronic device 1000 may determine a main region which has a predetermined shape and size and includes the reference region 311, based on a block importance value. For example, the main region may be preset to have a rectangular shape of a 5*2 size with respect to one block.

Referring to FIG. 4, a plurality of blocks located on a row right above the reference region 331 may have a block importance value "1", and a plurality of blocks which are located on a row including the reference region 331 or on a row right below the reference region 331 may have a block importance value which is greater than 1. Therefore, the electronic device 1000 may determine, as a main region, blocks 332 that have a relatively higher block importance value and form a rectangular shape having a 5*2 size with respect to one block.

When the main region 322 is determined, as illustrated in FIG. 4, a portion 340 of the image 300 corresponding to the main region 332 may be displayed on an electronic album.

According to an exemplary embodiment, the electronic device 1000 may be implemented to apply a weight value on a portion or a point of an image where auto focus is located.

Figure 5:
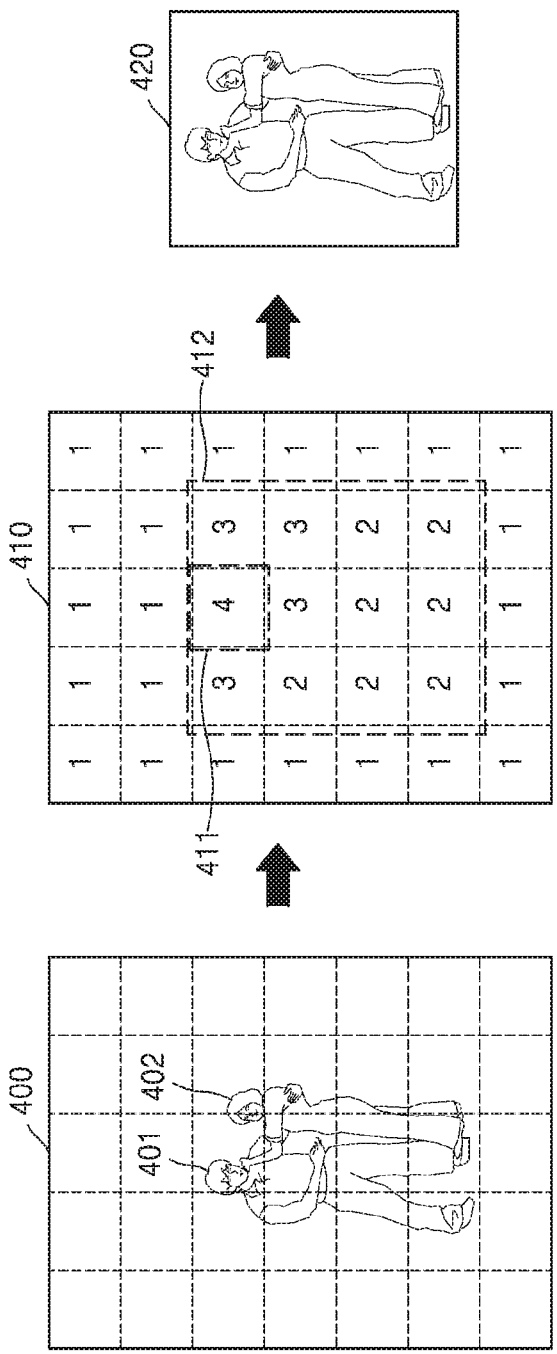
FIG. 5 is a diagram illustrating an example of determining a main region, according to another exemplary embodiment.

FIG. 5 is a diagram illustrating an example of determining a main region, according to another exemplary embodiment.

Referring to FIG. 5, an image 400 may be divided into a plurality of blocks having a square shape. In FIG. 5, a size of a block may be implemented to divide the image 400 into thirty-five equal parts, but a size or a shape of the block may be variously implemented. For example, the shape of the block may be polygonal such as rectangular or the like, or circular.

According to an exemplary embodiment, the electronic device 1000 may generate an importance map 410 including a plurality of regions, based on block importance values acquired from a plurality of blocks corresponding to the image 400. Here, the blocks of the image 400 may respectively correspond to the regions of the importance map 410, and block importance values of the blocks may be respectively mapped in the regions of the importance map 410.

According to an exemplary embodiment, the electronic device 1000 may acquire a block importance value, based on the amount of information of each of the plurality of blocks. Here, a block importance value of one block may be proportional to the amount of information of the one block. Furthermore, the electronic device 1000 may acquire a block importance value, based on faces 401 and 402 recognized in the image 400.

A method of recognizing the faces 401 and 402 in the image 400 is variously disclosed in the related art, and thus, its detailed description will not be provided here.

Referring to FIG. 5, block importance values of blocks corresponding to the faces 401 and 402 recognized in the image 400 may be acquired to have a relatively higher value. Here, the blocks corresponding to the recognized faces 401 and 402 may include at least a portion of each of the faces 401 and 402. For example, referring to FIG. 5, a block including a boundary of a thing may have a block importance value of at least 2, and a block importance value equal to the number of faces 401 and 402 may be added. Therefore, a block importance value of a block 411 where the number of the corresponding faces 401 and 402 is two may be 4. Also, a block importance value of a block where the number of a corresponding face is one may be 3.

According to an exemplary embodiment, the electronic device 1000 may determine, as a reference region, the block 411 having a highest block importance value among a plurality of blocks. Referring to FIG. 5, the block 411 having the highest block importance value among the plurality of blocks may be determined as the reference region 411.

The electronic device 1000 may determine a main region which has a predetermined shape and size and includes the reference region 411, based on a block importance value. For example, the main region may be preset to have a rectangular shape of a 3*4 size with respect to one block.

Referring to FIG. 5, a plurality of blocks located on a row right above the reference region 411 may have a block importance value "1", and two blocks which are respectively located on the left and the right sides of the reference region 411 may have a block importance value "3". Also, nine blocks which are located below the reference region 411 and the two blocks may have a block importance value "2" or "3".

Therefore, the electronic device 1000 may determine, as a main region, blocks 412 that include the reference region 411, form a rectangular shape of the 3*4 size with respect to one block, and have relatively higher block importance values.

When the main region 412 is determined, as illustrated in FIG. 5, a portion 420 of the image 400 corresponding to the main region 412 may be displayed on an electronic album.

Figure 6:
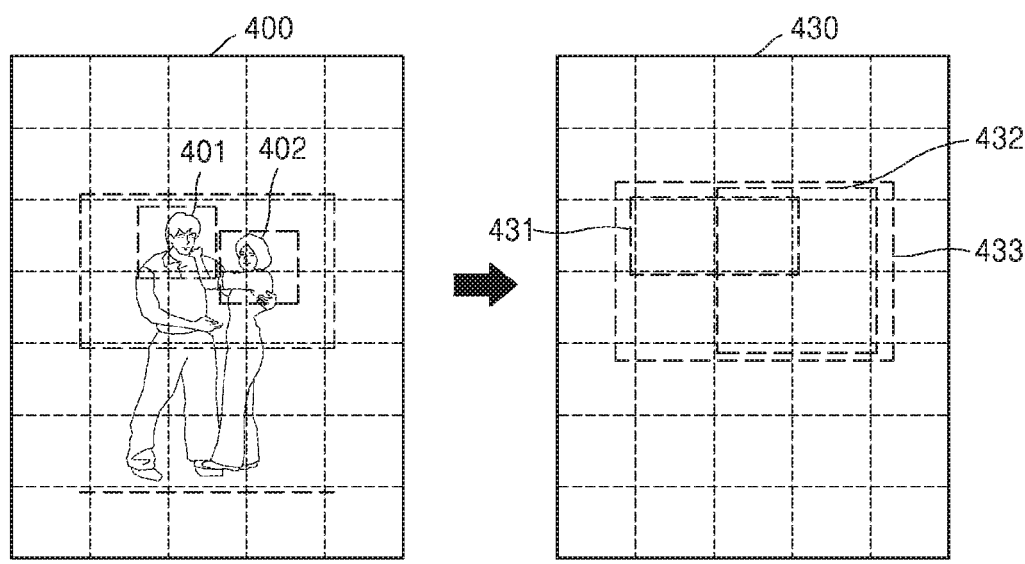
FIG. 6 is a diagram illustrating an example of determining a reference region, according to an exemplary embodiment.

FIG. 6 is a diagram illustrating an example of determining a reference region, according to an exemplary embodiment.

Referring to FIG. 6, an image 400 may be divided into a plurality of blocks having a square shape. In FIG. 6, a size of a block may be implemented to divide the image 400 into thirty-five equal parts, but a size or a shape of the block may be variously implemented. For example, the shape of the block may be polygonal such as rectangular or the like, or circular.

According to an exemplary embodiment, the electronic device 1000 may generate an importance map 430 including a plurality of regions, based on block importance values acquired from a plurality of blocks corresponding to the image 400. Here, the blocks of the image 400 may respectively correspond to the regions of the importance map 430, and block importance values of the blocks may be respectively mapped in the regions of the importance map 430.

According to an exemplary embodiment, the electronic device 1000 may recognize faces 401 and 402 in the image 400 and determine a reference region, based on faces 401 and 402 recognized in the image 400. A method of recognizing the faces 401 and 402 in the image 400 is variously disclosed in the related art, and thus, a detailed description thereof will not be provided here.

Referring to FIG. 6, the two faces 401 and 402 may be recognized in the image 400. Here, the electronic device 1000 may determine, among a plurality of blocks, a reference region 433 which includes blocks including at least a portion of each of the faces 401 and 402. For example, as illustrated in FIG. 6, when the face 401 of a man is recognized in two blocks 431 and the face 402 of a woman is recognized in four blocks 432, the reference region 433 which includes the two blocks 431 and the four blocks 432 may be determined in the importance map 430.

According to an exemplary embodiment, a reference region may be determined to have a rectangular shape. For example, referring to FIG. 6, the reference region 433 may be determined as blocks 433 which include the block 431 and 432 including at least a portion of the faces 401 and 402 and form the rectangular shape.

Furthermore, the electronic device 1000 may determine a main region that includes a reference region and has a predetermined shape and size, and a portion corresponding to the main region in the image 400 may be displayed on an electronic album.

Figure 7:
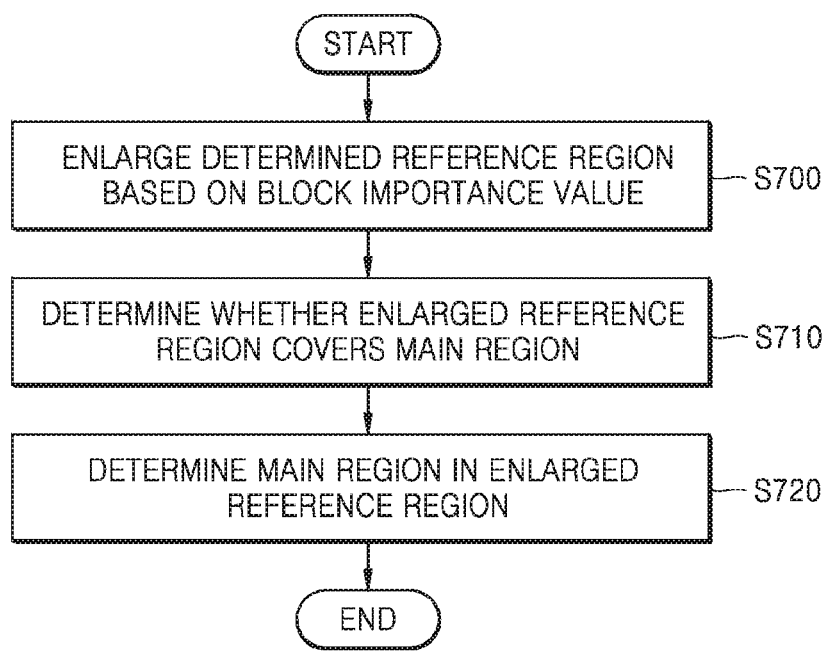
FIG. 7 is a flowchart of a method of determining a main region by enlarging a reference region, according to an exemplary embodiment.

FIG. 7 is a flowchart of a method of determining a main region by enlarging a reference region, according to an exemplary embodiment.

In operation S700, the electronic device 1000 may enlarge a determined reference region, based on a block importance value.

According to an exemplary embodiment, when the reference region is determined, the electronic device 1000 may enlarge the determined reference region, based on the block importance value. Here, the electronic device 1000 may enlarge the reference region, based on block importance values of peripheral blocks of the reference region (for example, block importance values of peripheral blocks located on upper, lower, left, and right sides of the reference region). For example, when the reference region includes only one block, the electronic device 1000 may compare the block importance values of the peripheral blocks located on the upper, lower, left, and right sides of the reference region to enlarge the reference region to cover a block having a highest block importance value among the peripheral blocks.

According to an exemplary embodiment, when a reference region includes a plurality of regions, peripheral blocks of the reference region may be blocks which are located on one side of the reference region and share a border with the reference region. For example, when a reference region are two blocks located on one row, peripheral blocks of the reference region may include two blocks located on an upper row right above the reference region, two blocks located on a lower row right below the reference region, a block located on the left side of the reference region, and a block located on the right side of the reference region.

According to an exemplary embodiment, peripheral blocks may be blocks surrounding a reference region. For example, the peripheral blocks may be blocks which are located on an upper side, an upper right side, a right side, a right lower side, a lower side, a lower left side, a left side, and an upper left side of the reference region.

According to an exemplary embodiment, the electronic device 1000 may enlarge a reference region by using a maximum value of block importance values as a search value. The electronic device 1000 may compare a search value, which is a maximum value of block importance values in an importance map, with block importance values of peripheral blocks of a reference region, and when finding a block which has a block importance value equal to or higher than the search value, the electronic device 1000 may enlarge the reference region to cover the block having the block importance value higher than the search value. When failing to find a block which has a block importance value equal to or higher than the search value, the electronic device 1000 may lower the search value to compare the lowered search value with the block importance values of the peripheral blocks.

In operation S710, the electronic device 1000 may determine whether the reference region which is enlarged in operation S700 covers a main region.

According to an exemplary embodiment, the determining whether an enlarged reference region cover a main region may denote determining whether a shape and a size of the enlarged reference region are at least equal to those of the main region. According to an exemplary embodiment, the determining whether an enlarged reference region cover a main region may denote determining whether the reference region is enlarged enough to cover the main region such that the main region is included within the enlarged reference region.

According to an exemplary embodiment, when a shape of a predetermined main region is rectangular, the electronic device 1000 may compare a width and a height of an enlarged reference region with a width and a height of a main region to determine whether the enlarged reference region covers the main region.

In operation S720, when it is determined in operation S710 that the enlarged reference region covers the main region, the electronic device 1000 may determine the main region in the enlarged reference region.

When it is determined in operation S710 that the enlarged reference region does not cover the main region, the electronic device 1000 may further enlarge the enlarged reference region, based on a block importance value.

Figure 8:
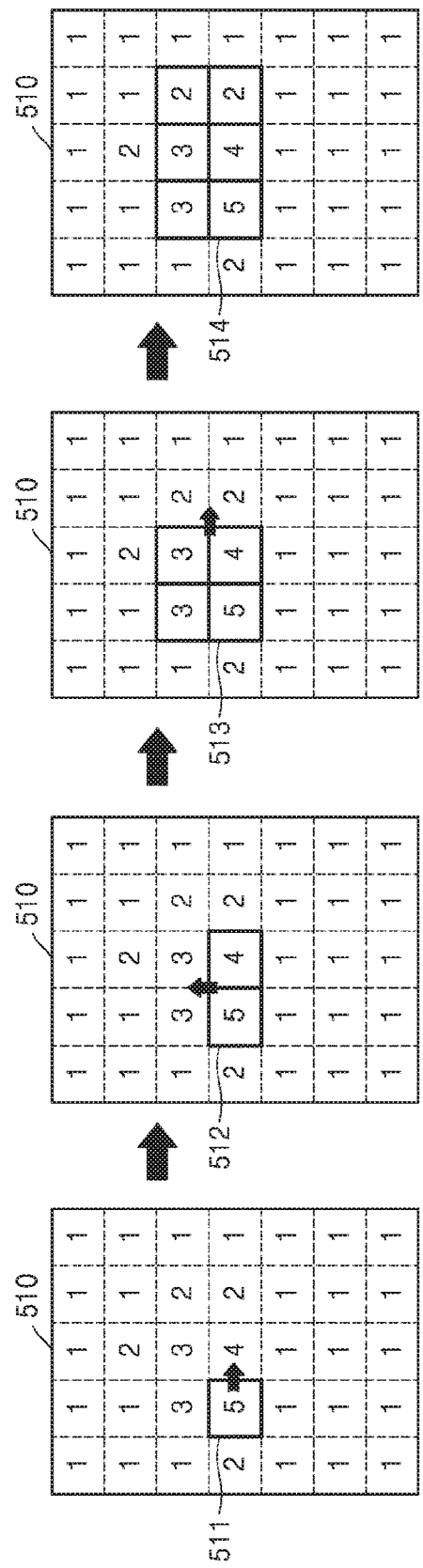
FIG. 8 is a diagram illustrating an example of enlarging a reference region, according to an exemplary embodiment.

FIG. 8 is a diagram illustrating an example of enlarging a reference region, according to an exemplary embodiment.

According to an exemplary embodiment, as illustrated in FIG. 8, an importance map 510 including thirty-five regions may be generated based on block importance values acquired from thirty-five blocks dividing an image into thirty-five equal parts.

According to an exemplary embodiment, a block having a highest block importance value among a plurality of blocks may be determined as a reference region. A method of determining a reference region is the same as the above-described method, and thus, a repetitive description is not repeated. Referring to FIG. 8, a block 511 having a highest block importance value "5" among a plurality of blocks may be determined as a reference region 511.

According to an exemplary embodiment, when the reference region 511 is determined, the electronic device 1000 may enlarge the determined reference region 511, based on a block importance value. Here, the electronic device 1000 may enlarge the reference region 511, based on block importance values of peripheral blocks of the reference region 511 (for example, block importance values of blocks which are located on upper, lower, left, and right sides of the reference region 511). Referring to FIG. 8, the electronic device 1000 may enlarge the reference region 511 to cover a block having, among the peripheral blocks of the reference region 511, a highest block importance value "4".

According to an exemplary embodiment, the electronic device 1000 may enlarge the determined reference region by using a maximum value of the block importance values as a search value. For example, referring to FIG. 8, the electronic device 1000 may compare a search value, which is a maximum value "5" of the block importance values in the importance map 510, with block importance values of peripheral blocks of the determined reference region 510 to enlarge the reference region 511 to cover a block having a block importance value which is equal to or higher than the search value. When failing to find a block having a block importance value which is equal to or higher than the search value, the electronic device 1000 may lower the search value to compare the lowered search value with the block importance values of the peripheral blocks.

As illustrated in FIG. 8, the determined reference region 511 is enlarged to cover two blocks 512, and then the electronic device 1000 may further enlarge the enlarged reference region 512, based on a block importance value. Here, the electronic device 1000 may enlarge the reference region 512, based on block importance values of the peripheral blocks of the enlarged reference region 512 (for example, block importance values of a block located on the left side of the reference region 512, a block located on the right side of the reference region 512, two blocks located on an upper side of the reference region 512, and two blocks located on a lower side of the reference region 512).

According to an exemplary embodiment, block importance values of a plurality of blocks may correspond to an average value of block importance values of the plurality of blocks. Referring to FIG. 8, an average value of block importance values of the two blocks located on an upper row right above the enlarged reference region 512 may be 3, and an average value of block importance values of the two blocks located on a lower row right below the enlarged reference region 512 may be 1.

Referring to FIG. 8, the reference region 512 may be enlarged to cover the two blocks which have a highest importance value "3" among the peripheral blocks of the reference region 512 and are located on the upper row of the enlarged reference region 512.

According to an exemplary embodiment, the electronic device 1000 may determine whether an enlarged reference region 513 covers a main region having a predetermined shape and size. According to an exemplary embodiment, the determining whether the enlarged reference region 513 covers the main region may denote determining whether a shape and a size of the reference region 513 are at least equal to those of the main region. According to an exemplary embodiment, the determining whether an enlarged reference region cover a main region may denote determining whether the reference region is enlarged enough to cover the main region such that the main region is included within the enlarged reference region 513.

For example, when a main region is preset to have a rectangular shape of a 3*2 size with respect to one block, the electronic device 1000 may determine whether the enlarged reference region 513 is enlarged enough to cover the main region and the main region is included with the enlarged reference region 513. Referring to FIG. 8, since the enlarged reference region 513 has a square shape of a 2*2 size with respect to one block, the enlarged reference region 513 does not cover the main region preset to have a rectangular shape of a 3*2 size with respect to one block. Therefore, the electronic device 1000 may determine that the enlarged reference region 513 does not cover the main region.

When it is determined that the enlarged reference region 513 does not cover the main region, the electronic device 1000 may further enlarge the enlarged reference region 513, based on the block importance value.

As illustrated in FIGS. 8C and 8D, the electronic device 1000 may further enlarge the enlarged reference region 513, based on the block importance value. Here, the electronic device 1000 may enlarge the enlarged reference region 513, based on block importance values of the peripheral blocks of the enlarged reference region 513 (for example, block importance values of two blocks located on each of upper, lower, left, and right sides of the enlarged reference region 513).

Here, block importance values of a plurality of blocks may correspond to an average value of the block importance values of the plurality of blocks. Referring to FIG. 8, an average value of block importance values of two blocks located on an upper row of the enlarged reference region 513 may be 1.5, an average value of block importance values of two blocks located on a lower row of the enlarged reference region 513 may be 1, an average value of block importance values of two blocks located on a left column of the enlarged reference region 513 may be 1.5, and an average value of block importance values of two blocks located on a right column of the enlarged reference region 513 may be 2.

Referring to FIG. 8, the reference region 513 may be further enlarged to cover the two blocks having a highest importance value "2" among the peripheral blocks of the reference region 513, which are located on the right side of the reference region 513.

According to an exemplary embodiment, the electronic device 1000 may again determine whether an enlarged reference region 514 covers a main region having a predetermined shape and size.

Referring to FIG. 8, since the enlarged reference region 514 has a rectangular shape of a 3*2 size with respect to one block, the enlarged reference region 514 may be determined as covering a main region which has a rectangular shape of a 3*2 size with respect to one block.

When it is determined that the enlarged reference region 514 covers the main region, the electronic device 1000 may determine the main region in the enlarged reference region 514. Referring to FIG. 8, since the enlarged reference region 514 has a rectangular shape of a 3*2 size with respect to one block, the enlarged reference region 514 itself may be determined as the main region.

According to an exemplary embodiment, the electronic device 1000 may enlarge a reference region based on a block size corresponding to the reference region. For example, in FIG. 8, it is illustrated that the electronic device 1000 further enlarges the reference region 513 based on a block size of the two blocks located on the right column of the reference region 513. However, the electronic device 1000 may enlarge the reference region 513 based on a block size of corresponding to the reference region 513, for example, a block size of 2*2 blocks. If a reference region is implemented to be enlarged based on a block size of 2*2 blocks at a time, the reference region 513 may be enlarged based on block importance values of 2*2 blocks located near the reference region 513.

Figure 9:
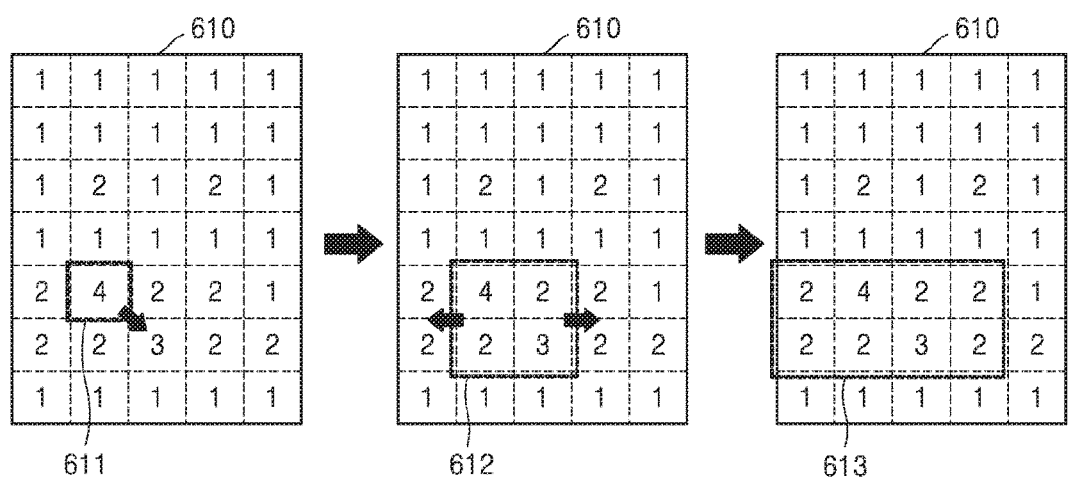
FIG. 9 is a diagram illustrating an example of enlarging a reference region, according to an exemplary embodiment.

FIG. 9 is a diagram illustrating an example of enlarging a reference region, according to an exemplary embodiment.

Referring to FIG. 9, an importance map 610 including thirty-five regions may be generated based on block importance values acquired from thirty-five blocks dividing an image into thirty-five equal parts.

According to an exemplary embodiment, a block having a highest block importance value among a plurality of blocks may be determined as a reference region. A method of determining a reference region is the same as the above-described method, and thus, a repetitive description is not repeated. Referring to FIG. 9, a block 511 having a highest block importance value "4" among a plurality of blocks may be determined as a reference region 611.

As illustrated in FIG. 9, when the reference region 611 is determined, the electronic device 1000 may enlarge the determined reference region 611, based on a block importance value. Here, the electronic device 1000 may enlarge the reference region 611, based on block importance values of peripheral blocks of the reference region 611 (for example, block importance values of peripheral blocks surrounding the reference region 611). Here, the peripheral blocks may be blocks which are located on an upper side, an upper right side, a right side, a right lower side, a lower side, a lower left side, a left side, and an upper left side of the reference region 611.

Referring to FIG. 9, the reference region 611 may be enlarged to cover a block which has, among the peripheral blocks of the reference region 611, a highest block importance value "3".

When a reference region is enlarged to cover a block which is located in a diagonal direction of the reference region, the reference region may be enlarged to cover blocks which are located in directions of a vertical component and a horizontal component of the diagonal direction. Referring to FIG. 9, the reference region 611 may be enlarged to cover a block which is located in a diagonal direction of the reference region 611 and blocks which are located in directions of a vertical component and a horizontal component of the diagonal direction, and an enlarged reference region 612 may form a square shape having a 2*2 size.

According to an exemplary embodiment, the electronic device 1000 may determine whether the enlarged reference region 612 covers a main region having a predetermined shape and size.

For example, when a main region is preset to have a rectangular shape of a 4*2 size with respect to one block, and the enlarged reference region 612 has a square shape of a 2*2 size as illustrated in FIG. 9, the enlarged reference region 612 does not cover the main region. Therefore, the electronic device 1000 may determine that the enlarged reference region 612 does not cover the main region.

When it is determined that the enlarged reference region 612 does not cover the main region, the electronic device 1000 may further enlarge the enlarged reference region 612, based on a block importance value.

According to an exemplary embodiment, when a width of a determined reference region or an enlarged reference region is equal to a width a preset main region, the electronic device 1000 may enlarge the determined reference region or the enlarged reference region in a vertical direction, namely, an upward direction and/or a downward direction of with respect to the determined reference region or the enlarged reference region. Therefore, peripheral blocks of the determined reference region or the enlarged reference region may be limited to blocks which are located in the upward or downward directions with respect to the determined reference region or the enlarged reference region.

Likewise, when a height of a determined reference region or an enlarged reference region is equal to a height of a preset main region, the electronic device 1000 may enlarge the determined reference region or the enlarged reference region in a horizontal direction, namely, a leftward and/or a rightward direction of the determined reference region or the enlarged reference region. Therefore, peripheral blocks of the determined reference region or the enlarged reference region may be limited to blocks which are located in the leftward or rightward directions with respect to the determined reference region or the enlarged reference region.

For example, when the main region is preset to have a rectangular shape of a 4*2 size with respect to one block, a height of the main region is 2, and the enlarged reference region 612 has a square shape of a 2*2 size with respect to one block and a height of the enlarged reference region 612 is 2 as illustrated in FIG. 9, the electronic device 1000 may enlarge the enlarged reference region 612 in a horizontal direction of the reference region 612. Referring to FIG. 9, the electronic device 1000 may enlarge the enlarged reference region 612 in leftward and rightward directions with respect to the enlarged reference region 612.

According to an exemplary embodiment, when block importance values of a plurality of peripheral blocks are the same, the electronic device 1000 may enlarge a reference region to cover the plurality of peripheral blocks having the same block importance values. Referring to FIG. 9, an average value of two peripheral blocks located on a left column of the enlarged reference region 612 may be 2, and identically, an average value of two peripheral blocks which are located on a right column of the enlarged reference region 612 may be 2. In this case, the electronic device 1000 may further enlarge the enlarged reference region 612 in both leftward and rightward directions.

According to an exemplary embodiment, the electronic device 1000 may determine again whether the enlarged reference region 613 covers a main region having a predetermined shape and size.

Referring to FIG. 9, since the enlarged reference region 613 has a rectangular shape of a 4*2 size with respect to one block, the enlarged reference region 613 may be determined as covering a main region.

When it is determined that the enlarged reference region 613 covers the main region, the electronic device 1000 may determine the main region in the enlarged reference region 613. Referring to FIG. 9, since the enlarged reference region 613 has a rectangular shape of a 4*2 size with respect to one block, the enlarged reference region 613 itself may be determined as a main region 613.

Figure 10:
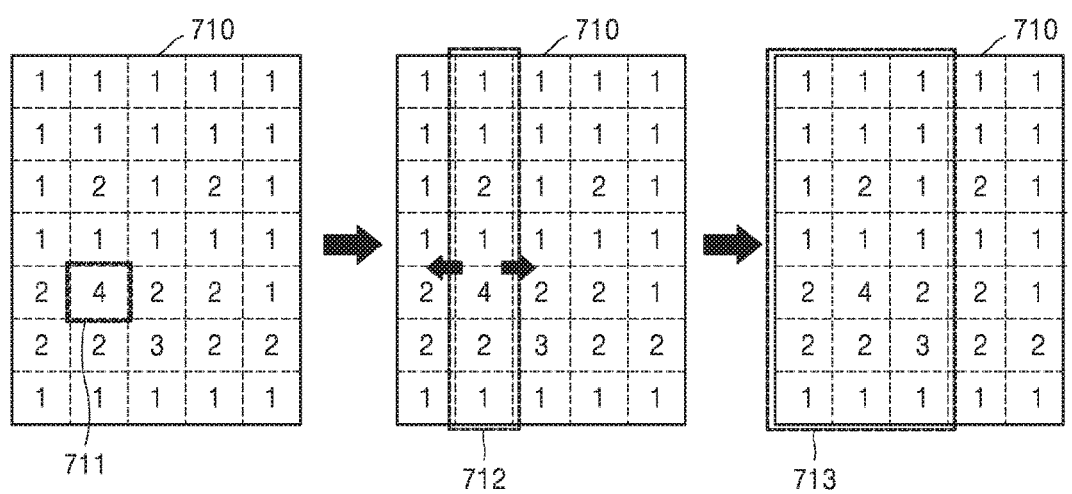
FIG. 10 is a diagram illustrating an example of enlarging a reference region, according to another exemplary embodiment.

FIG. 10 is a diagram illustrating an example of enlarging a reference region, according to an exemplary embodiment.

Referring to FIG. 10, an importance map 710 including thirty-five blocks may be generated based on block importance values acquired from thirty-five blocks dividing an image into thirty-five equal parts.

According to an exemplary embodiment, when a maximum width of a preset main region is equal to a width of an image, the electronic device 1000 may determine a reference region having the same width as that of the image.

Likewise, when a maximum height of the preset main region is equal to a height of an image, the electronic device 1000 may determine a reference region having the same height as that of the image.

For example, when an image has a rectangular shape of a 5*7 size with respect to one block, a height of the image is 7, a main region is preset to have a rectangular shape of a 3*7 size with respect to one block, and a maximum height of the main region is 7, the electronic device 1000 may determine a reference region having the same height as that of the image.

Referring to FIG. 10, the electronic device 1000 may determine, based on a block 711 which has a highest block importance value among a plurality of blocks, a reference region 712 including the block 711 and having the same height as that of the image. The determined reference region 712 may be determined as blocks 712 which are located on a column including the block 711 which has the highest block importance value.

According to an exemplary embodiment, when the reference region 712 is determined, the electronic device 1000 may enlarge the determined reference region 712, based on a block importance value. Referring to FIG. 10, since a height of the determined reference region 712 is equal to a height of a preset main region, the electronic device 1000 may enlarge the determined reference region 712 in a horizontal direction, namely, in leftward and rightward directions with respect to the determined reference region 712. Therefore, peripheral blocks of the determined reference region 712 may be limited to blocks which are located in the leftward and rightward directions with respect to the determined reference region 712.

For example, when the main region is preset to have a rectangular shape of a 3*7 size with respect to one block, a height of the main region is 7, the determined reference region 712 has a rectangular shape of a 1*7 size with respect to one block and a height of the determined reference region 712 is 7 as illustrated in FIG. 10, the electronic device 1000 may enlarge the reference region 712 in a horizontal direction of the reference region 712. Referring to FIG. 10B, the electronic device 1000 may enlarge the reference region 712 in leftward and rightward directions of the reference region 712.

According to an exemplary embodiment, the electronic device 1000 may enlarge a reference region by using a maximum value of a block importance values as a search value. The electronic device 1000 may compare a search value, which is a maximum value of block importance values in the importance map 710, with block importance values of peripheral blocks of the reference region. When finding a block which has a block importance value equal to or higher than the search value, the electronic device 1000 may enlarge the reference region to cover the block having the block importance value equal to or higher than the search value. When failing to find a block having a block importance value equal to or higher than the search value, the electronic device 1000 may lower the search value to compare the lowered search value with the block importance values of the peripheral blocks. Here, block importance values of the peripheral blocks may be an average value of the block importance values of the peripheral blocks.

For example, referring to FIG. 10, the electronic device 1000 may enlarge the determined reference region 712 by using a maximum value of the block importance values "4", as a search value. When failing to find a block having a block importance value equal to or higher than the search value among peripheral blocks, the electronic device 1000 may lower the search value to compare the lowered search value with the block importance values of the peripheral blocks. For example, the electronic device 1000 may lower the search value to 1 to compare the search value "1" with the block importance values of the peripheral blocks. Referring to FIG. 10, an average value of block importance values of blocks which are located on a left column of the reference region 712 is 1.29, an average value of block importance values of blocks which are located on a right column of the reference region 712 is 1.43, and all the average values are higher than the search value. In this case, the electronic device 1000 may enlarge the reference region 712 in leftward and rightward directions with respect to the reference region 712.

Referring to FIG. 10, since an enlarged reference region 713 has a rectangular shape of a 3*7 size with respect to one block, the enlarged reference region 713 may be determined as covering a main region. Furthermore, the electronic device 1000 may determine the main region in the enlarged reference region 713. Referring to FIG. 10, since the enlarged reference region 713 has a rectangular shape of a 3*7 size with respect to one block, the enlarged reference region 713 itself may be determined as a main region 613.

According to an exemplary embodiment, when a reference region is composed of a plurality of blocks, peripheral blocks of the reference region may be blocks which are located on one side of the reference region and share a border with the reference region. When at least one of the blocks located on the one side of the reference region has a block importance value equal to or higher than a search value, the electronic device 1000 may enlarge the reference region in a direction toward the one side.

For example, as illustrated in FIG. 10, when the determined reference region 712 has a rectangular shape of a 1*7 size with respect to one block, peripheral blocks of the reference region 712 may be blocks which are located on the left and the right sides of the reference region 712 and share a border with the reference region 712. According to an exemplary embodiment, the electronic device 1000 may progressively lower a search value starting from a maximum value of block importance values to compare the lowered search value with block importance values of the peripheral blocks. For example, referring to FIG. 10, when the electronic device 1000 enlarges the reference region 712 by using a search value "3", and one of blocks which are located on a right column of the reference region 712 has a block importance value "3" that is equal to the search value, the electronic device 1000 may enlarge the reference region 712 in a rightward direction with respect to the reference region 712.

Figure 11:
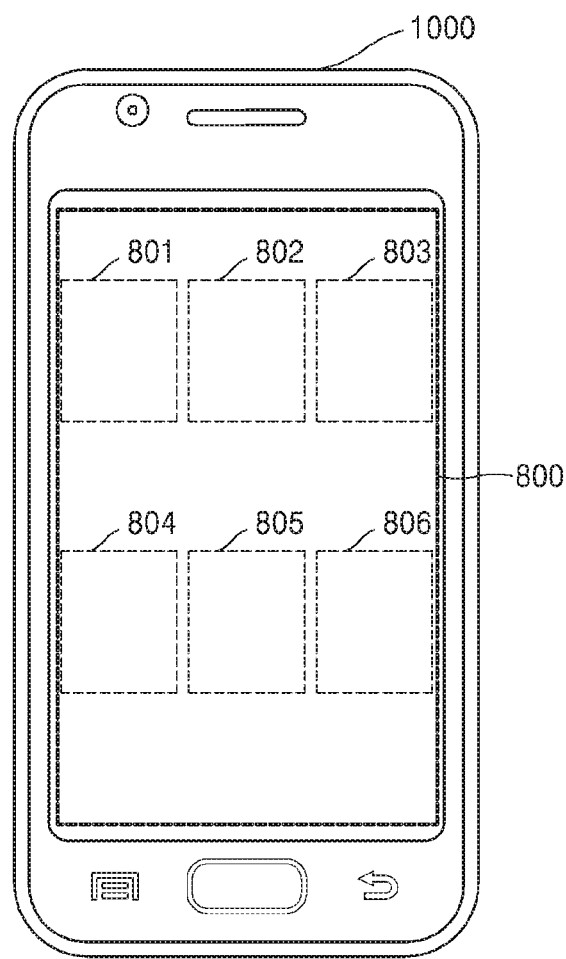
FIG. 11 is a diagram illustrating a cell constituting an electronic album, according to an exemplary embodiment.

FIG. 11 is a diagram illustrating a cell constituting an electronic album, according to an exemplary embodiment.

As illustrated in FIG. 11, an electronic album 800 may be composed of a plurality of cells 801 to 806.

When a main region is determined in each of a plurality of images by the above-described method, the electronic device 1000 may display portions, respectively corresponding to a plurality of main regions, on the respective cells 801 to 806 of the electronic album 800.

According to an exemplary embodiment, a main region may be preset to have a shape congruent or similar to that of the cells 801 to 806. For example, when a ratio of a width to a height of each of the cells 801 to 806 is 4:3, the shape of the main region may be preset to have a 4:3 ratio of a width to a height of the main region.

According to an exemplary embodiment, the electronic device 1000 may enlarge or reduce a portion of the image corresponding to the main region to fit the cells 801 to 806 and may display the enlarged or reduced portion. That is, since the main region has a shape congruent or similar to that of the cells 801 to 806 and the portion of the image corresponding to the main region is enlarged or reduced to fit the cells 801 to 806, the portion corresponding to the main region may be displayed wholly on the cells 801 to 806.

According to an exemplary embodiment, the electronic device 1000 may preset a width of the main region, based on at least one selected from a ratio of a width of the image to a width of each of the cells 801 to 806 constituting the electronic album 800 and a ratio of a height of the image of to a height of each of the cells 801 to 806 constituting the electronic album 800.

According to an exemplary embodiment, the electronic device 1000 may preset a height of the main region, based on at least one selected from a ratio of a width of the image to a width of each of the cells 801 to 806 constituting the electronic album 800 and a ratio of a height of the image of to a height of each of the cells 801 to 806 constituting the electronic album 800.

According to an exemplary embodiment, when the width of the image is W, a height of the image is H, the width of each of the cells 801 to 806 is a, and the height of each of the cells 801 to 806 is b, by using a smaller value t between w/a and h/b, the electronic device 1000 may preset, in an importance map corresponding to the image, a main region, where a width is w*t and a height is h*t.

Figure 12:
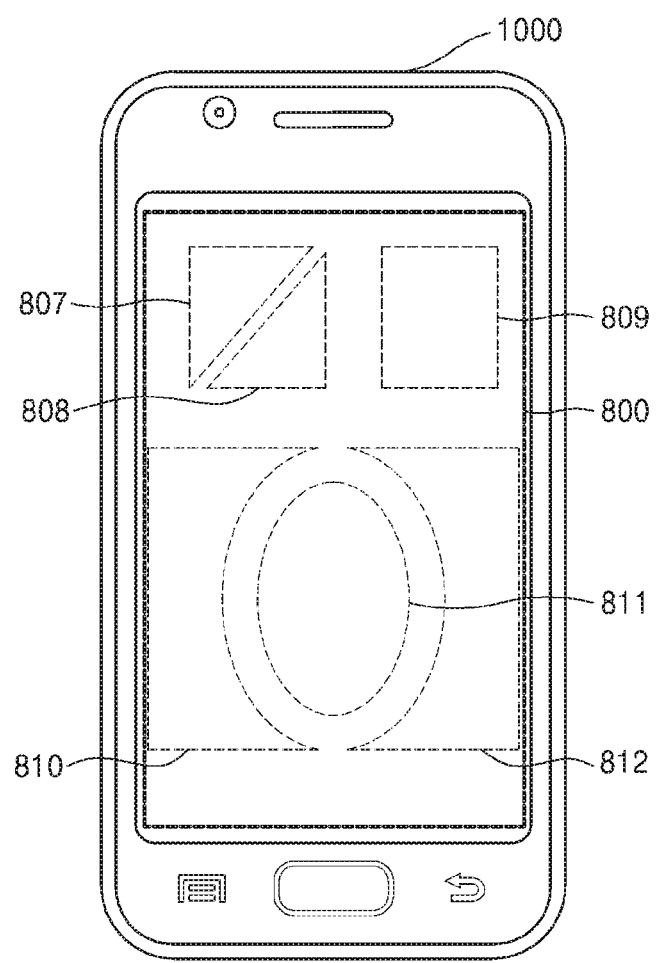
FIG. 12 is a diagram illustrating a cell constituting an electronic album, according to another exemplary embodiment.

FIG. 12 is a diagram illustrating a cell constituting an electronic album, according to an exemplary embodiment.

As illustrated in FIG. 12, an electronic album 800 may include a plurality of cells 807, 808, 809, 810, 811, and 812. In this case, each of the cells 807, 808, 809, 810, 811, and 812 may have various shapes.

When a main region is determined in each of a plurality of images by the above-described method, the electronic device 1000 may display portions, respectively corresponding to a plurality of main regions, on the respective cells 807 to 812 of the electronic album 800.

According to an exemplary embodiment, when the main region is preset to have a shape congruent or similar to that of the cells 801 to 806, the electronic device 1000 may enlarge or reduce a portion of the image corresponding to the main region to fit the cells 807 to 812 and may display the enlarged or reduced portion. That is, since the shape of the main region has the shape congruent or similar to that of the cells 807 to 812 and the portion of the image corresponding to the main region is enlarged or reduced to fit the cells 807 to 812, the portion corresponding to the main region may be displayed wholly on the cells 807 to 812.

Figure 13:
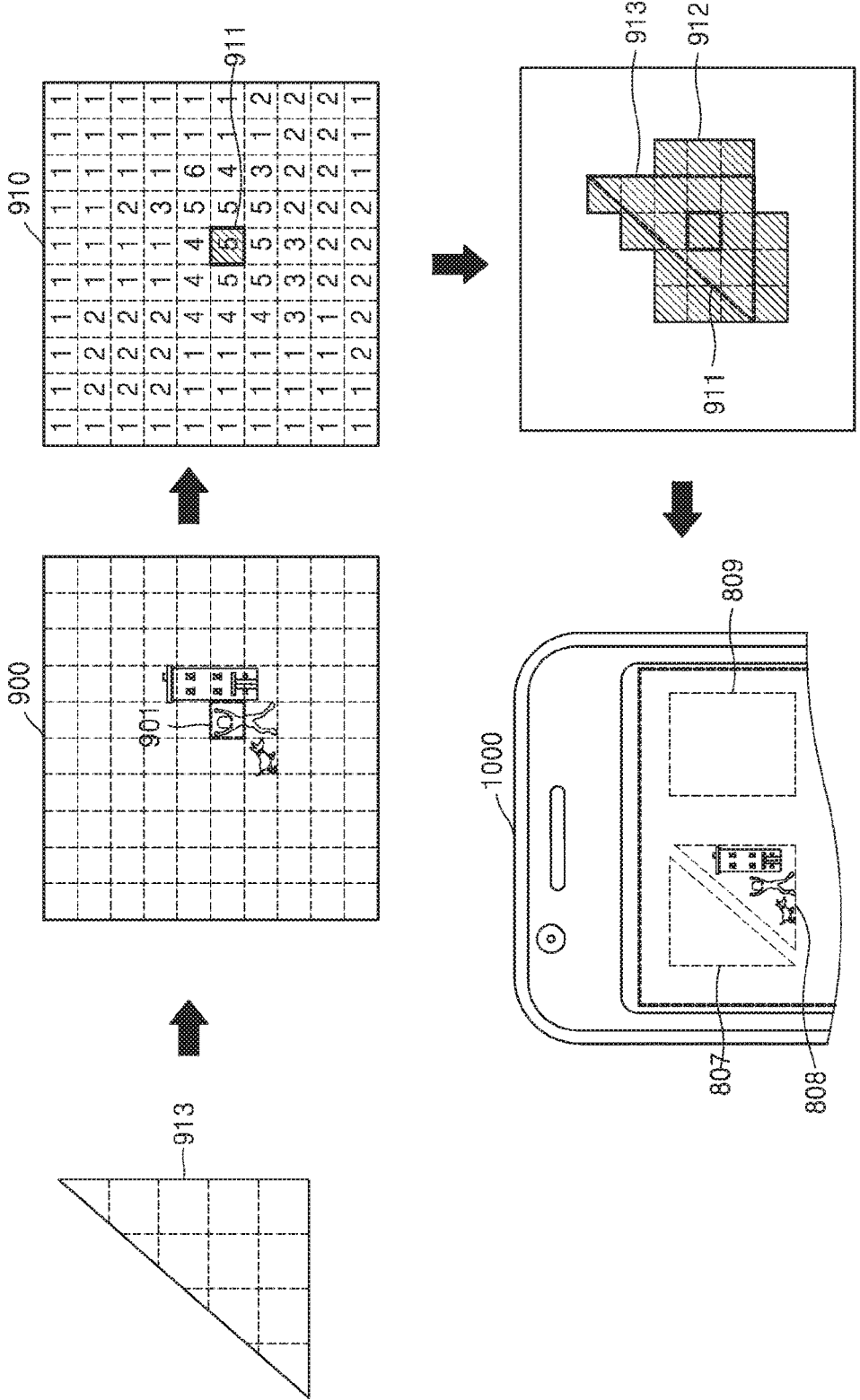
FIG. 13 is a diagram illustrating an example of determining a main region by enlarging a reference region, according to an exemplary embodiment.

FIG. 13 is a diagram illustrating an example of determining a main region by enlarging a reference region, according to an exemplary embodiment.

According to an exemplary embodiment, a shape of a cell constituting an electronic album may be triangular. In this case, as illustrated in FIG. 13A, a main region 913 may be preset to have a triangular shape congruent or similar to that of a corresponding cell. Furthermore, the main region 913 may be preset to have a maximum width of 4 and a maximum height of 5 with respect to one block.

Referring to FIG. 13, the electronic device 1000 may acquire block importance values of a plurality of blocks corresponding to the image 900 and generate an importance map 901 corresponding to the image 900, based on the block importance values.

As illustrated in FIG. 13, the electronic device 1000 may recognize a face 901 in the image 900 and determine a reference region including at least one block 911 corresponding to a portion where the face 901 is recognized.

As illustrated in FIG. 13, the electronic device 1000 may enlarge a reference region 911, based on a block importance value. A method of enlarging the reference region 911 is the same as the above-described method, and thus, a repetitive description is not repeated.

The electronic device 1000 may determine whether an enlarged reference region 912 covers a reference region 913. Referring to FIG. 13, the main region 913 having a base of "4" and a height of "5" may be covered by the enlarged reference region 912, and thus, the electronic device 1000 may determine the enlarged reference region 912 as covering the main region 913 to determine the main region 913 within the enlarged reference region 912.

When the main region 913 is determined, a portion 920 of the image 900 corresponding to the main region 913 may be displayed on a cell 808 of an electronic album 800 as illustrated in FIG. 13. Here, the portion 820 of the image 900 corresponding to the main region 913 may be enlarged or reduced to fit the cell 808 and displayed.

Figure 14:
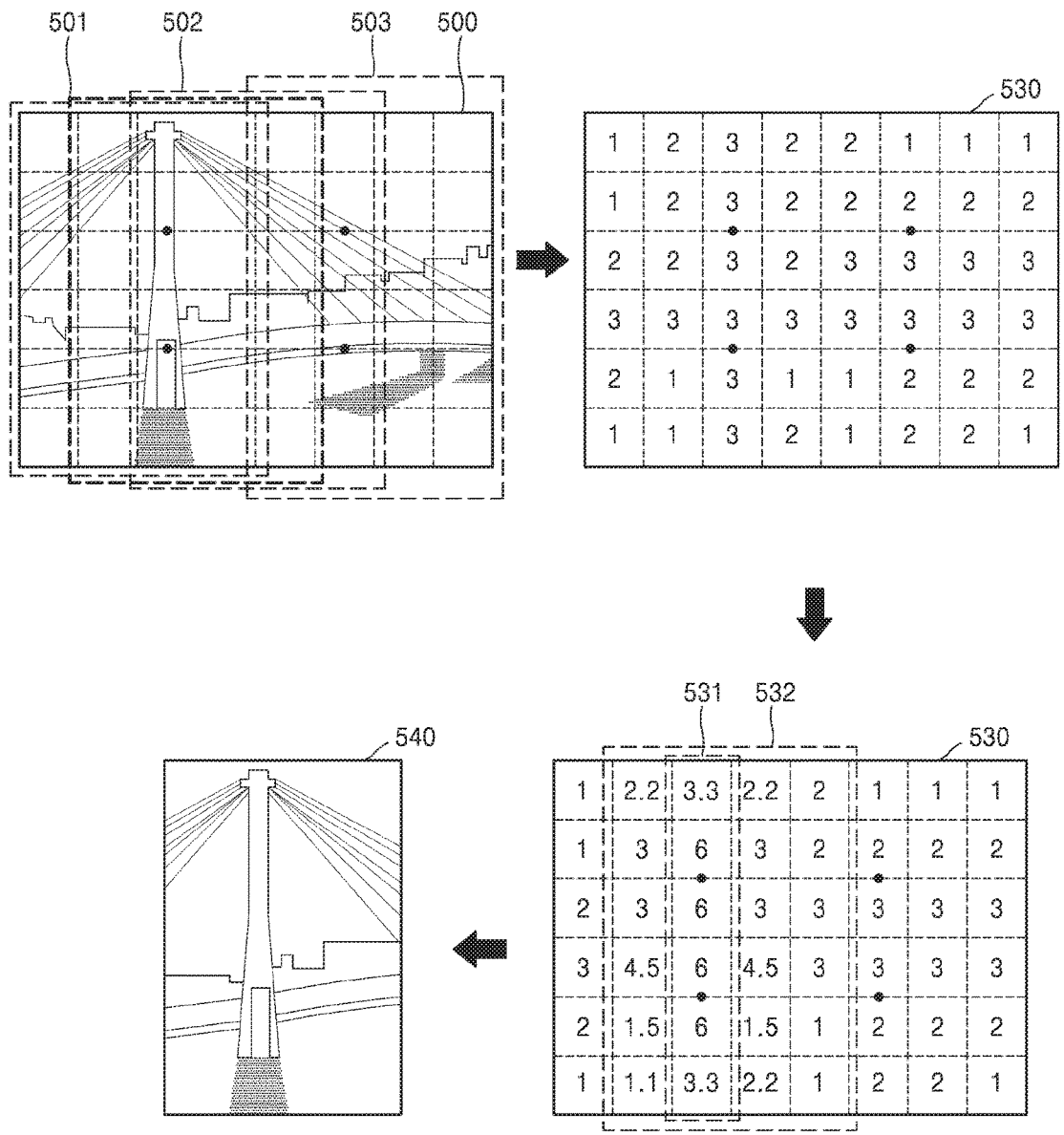
FIG. 14 is a diagram illustrating an example of determining a main region by enlarging a reference region, according to another exemplary embodiment.

FIG. 14 is a diagram illustrating an example of determining a main region by enlarging a reference region, according to an exemplary embodiment.

Referring to FIG. 14, an image 500 may be divided into a plurality of blocks having a square shape. In FIG. 14, a size of a block may be implemented to divide the image 500 into forty-eight equal parts, but a size or a shape of the block may be variously implemented. For example, the shape of the block may be polygonal such as rectangular or the like, or circular.

According to an exemplary embodiment, the electronic device 1000 may generate an importance map 530 corresponding to the image 500, based on a block importance value. Here, the importance map 530 may have a plurality of regions respectively corresponding to a plurality of blocks corresponding to the image 500. In this case, the electronic device 1000 may map a block importance value of each of the blocks in a corresponding region of the importance map 530.

According to an exemplary embodiment, as illustrated in FIG. 14, the electronic device 1000 may acquire a block importance value, based on the amount of information of each of the plurality of blocks. Here, a block importance value of one block may be proportional to the amount of information of the one block. Furthermore, as illustrated in FIG. 14, the electronic device 1000 may acquire the block importance value, based on a weight value based on a composition of an image.

Here, the composition of the image may be based on the Rule of Thirds. In consideration that content to be emphasized by a user in an image is located at a certain position in the image, the electronic device 1000 may acquire block importance values of a plurality of blocks corresponding to the image, based on a weight value based on a composition of the image.

According to an exemplary embodiment, as illustrated in FIG. 14, the electronic device 1000 may recognize the image 500 as three segments 501, 502, and 503, for determining one of two vertical lines to which a weight value is to be applied. Furthermore, the electronic device 1000 may determine how many blocks having a relatively higher block importance value are arranged in a vertical direction each of the segments 501, 502, and 503.

Determining how many blocks having a relatively higher block importance value are arranged in a vertical direction may denote determining how many blocks having a block importance value within a predetermined range from a highest block importance value are arranged in a vertical direction with respect to one or more blocks having the highest block importance value.

For example, referring to FIG. 14, both of a first segment 501 and a second segment 502 have six blocks of a highest block importance value "3" arranged vertically in a column. A third segment 503 has at most two blocks of a highest block importance value "3" arranged vertically in a column. Therefore, the electronic device 1000 may determine a left vertical line among two vertical lines based on the first segment 501 and the second segment 502 having the most blocks of the highest importance value, as one to which a weight value is to be applied.

According to an exemplary embodiment, when each of segments has the same number of blocks of a relatively higher block importance value arranged vertically in a column, or when a difference between the two numbers of blocks with a relatively higher block importance value arranged vertically in a column in each of segments is within a preset range, a highest weight value may be applied at a center point of an image.

According to an exemplary embodiment, the number of segments for an image is not limited thereto, and may be implemented as various numbers.

According to an exemplary embodiment, each of segments for an image may have the same dimension. For example, as illustrated in FIG. 14, when the image 500 is recognized as the three segments 501, 502, and 503, the three segments 501, 502, and 503 may have the same dimension.

When a vertical line to which a weight value is to be applied is determined, the electronic device 1000 may apply the weight value to a plurality of blocks located on the determined vertical line. Referring to FIG. 14, a block importance value of blocks to which the weight value is applied may increase.

According to an exemplary embodiment, a weight value may be applied to one virtual horizontal line of a plurality of virtual horizontal lines, or may be applied to one virtual vertical line of a plurality of virtual vertical lines. In this case, the weight value may be applied with respect to certain points located on the one virtual horizontal line or the one virtual vertical line which passes through intersection points where each of the virtual horizontal lines intersects respectively the virtual vertical lines.

Referring to FIG. 14, a weight value may be applied with respect to two points located on a vertical line to which the weight value is to be applied, among four intersection points where each of virtual horizontal lines intersects respectively virtual vertical lines. In this case, the weight value may be a Gaussian weight value. The weight value may be the highest at the two points and may be reduced as a position of a point in the image becomes farther away from the two points. Therefore, as illustrated in FIG. 14, a double weight value may be applied to blocks which are located above and below the two points, and a block importance value of each of the blocks which are located above and below the two points may be 6, and a weight value applied to blocks may be reduced as a position of a point in the image becomes farther away from the two points.

According to an exemplary embodiment, when a maximum height of a preset main region is equal to a height of an image, the electronic device 1000 may determine a reference region having the same height as that of the image.

For example, when an image has a rectangular shape of an 8*6 size with respect to one block, a height of the image is 6, a main region is preset to have a rectangular shape of a 4*6 size with respect to one block, and a maximum height of the main region is 6, the electronic device 1000 may determine a reference region having the same height as that of the image.

Referring to FIG. 14, the electronic device 1000 may determine a reference region 531 that includes a block having a highest block importance value among a plurality of blocks and has the same height as that of an image. The reference region 531 may be determined as blocks which are located on a column including the block having the highest block importance value.

According to an exemplary embodiment, when the reference region 531 is determined, the electronic device 1000 may enlarge the determined reference region 531, based on a block importance value. Referring to FIG. 14, since a height of the determined reference region 531 is equal to that of the preset main region, the electronic device 1000 may enlarge the determined reference region 531 in a horizontal direction, namely, left and right directions with respect to the determined reference region 531.

Referring to FIG. 14, since an enlarged reference region 532 has a rectangular shape of a 4*6 size with respect to one block, the enlarged reference region 532 may be determined as covering a main region which is preset to have a certain shape and a certain dimension. Furthermore, the electronic device 1000 may determine the main region in the enlarged reference region 532. Referring to FIG. 14, since the enlarged reference region 532 has a rectangular shape of a 4*6 size with respect to one block, the enlarged reference region 532 itself may be determined as a main region 532.

When the main region 532 is determined, a portion 540 of the image 500 corresponding to the determined main region 532 may be displayed as illustrated in FIG. 14.

Figure 15:
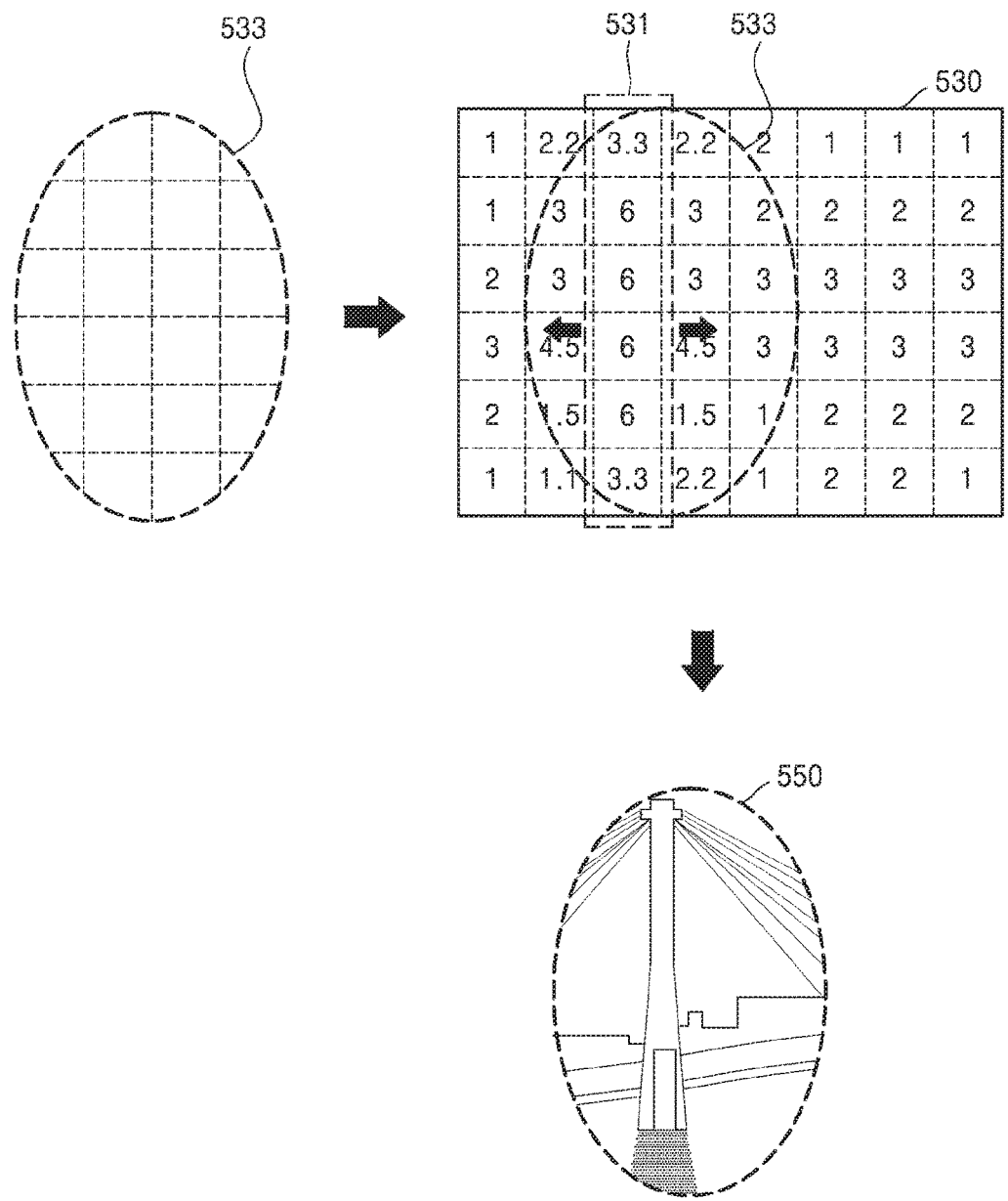
FIG. 15 is a diagram illustrating an example of determining a main region by enlarging a reference region, according to another exemplary embodiment.

FIG. 15 is a diagram illustrating an example of determining a main region by enlarging a reference region, according to an exemplary embodiment.

According to an exemplary embodiment, a shape of a cell constituting an electronic album may be circular or elliptical. In this case, as illustrated in FIG. 15, a main region 533 may be preset to have an elliptical shape congruent or similar to that of the cell having an elliptical shape. Also, a maximum width of the main region 533 may be preset to 4 with respect to one block, and a maximum height may be preset to 6.

Referring to FIG. 15, the electronic device 1000 may acquire block importance values of a plurality of blocks corresponding to an image 500 (see FIG. 14) and generate an importance map 530 corresponding to the image 500, based on the acquired block importance values. In this case, the block importance values may be acquired based on a weight value based on a composition of the image 500.

According to an exemplary embodiment, when a maximum height of a preset main region is equal to a height of an image, the electronic device 1000 may determine a reference region having the same height as that of the image. For example, when the image 500 has a rectangular shape of an 8*6 size with respect to one block, a height of the image 500 is 6, a preset main region has an elliptical shape, and a maximum height of the preset main region is 6 with respect to one block, the electronic device 1000 may determine a reference region having the same height as that of the image 500.

Referring to FIG. 15, the electronic device 1000 may determine the reference region 531 that includes a block having a highest block importance value among a plurality of blocks and has the same height as that of an image. The reference region 531 may be determined as blocks 531 which are located on a column including the block having the highest block importance value.

According to an exemplary embodiment, when the reference region 531 is determined, the electronic device 1000 may enlarge the determined reference region 531, based on the block importance value. Referring to FIG. 15, since a height of the determined reference region 531 is equal to that of a preset main region, the electronic device 1000 may enlarge the determined reference region 531 in a horizontal direction, namely, left and right directions with respect to the determined reference region 531.

Referring to FIG. 15, the reference region 531 may be enlarged until the reference region 531 becomes to cover the preset main region 533.

According to an exemplary embodiment, the reference region 531 may be enlarged until the reference region 531 has an enough size to include the preset main region 533 of an elliptical shape. For example, referring to FIG. 15, the reference region 531 may be enlarged until the reference region 531 has a 4*6 size, which is big enough to include the main region 533 having an elliptical shape therewithin. After the reference region 531 is enlarged and the reference region 531 becomes to have a 4*6 size including the preset main region 533 of the elliptical shape, the electronic device 1000 may determine the main region 533 in an enlarged reference region.

When the main region 533 is determined, a portion 550 of the image 500 corresponding to the determined main region 533 may be displayed as illustrated in FIG. 15.

The portion 550 may be displayed on a cell of an electronic album. Here, the portion 550 may be enlarged or reduced to fit the cell and displayed.

Figure 16:
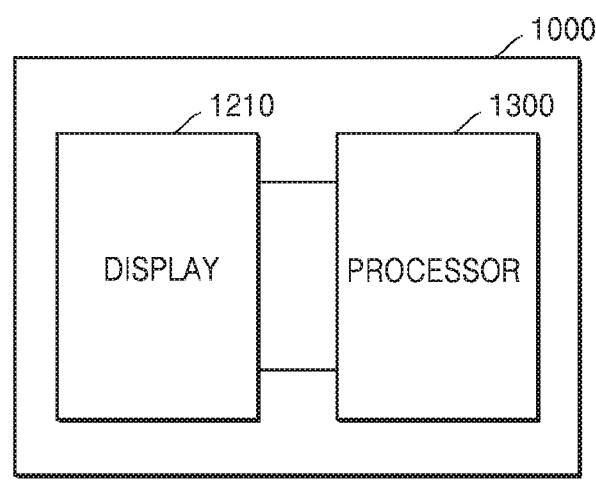
FIGS. 16 and 17 are block diagrams illustrating an electronic device according to an exemplary embodiment.
Figure 17:
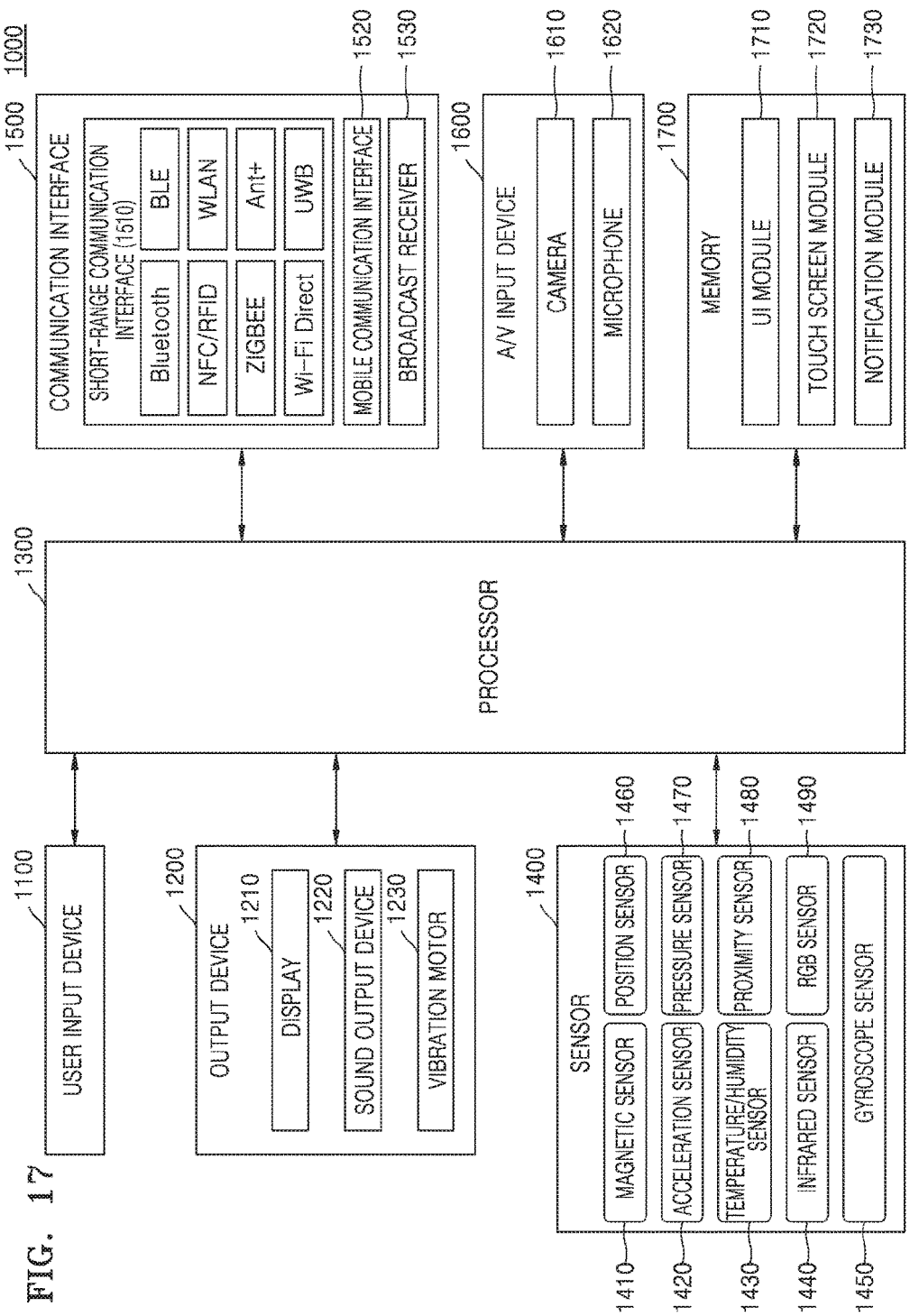

FIGS. 16 and 17 are block diagrams illustrating an electronic device 1000 according to an exemplary embodiment.

As illustrated in FIG. 16, the electronic device 1000 according to an exemplary embodiment may include a display 1210 and a processor 1300. However, all of the elements illustrated in FIG. 16 are not essential elements. The electronic device 1000 may include additional elements, in addition to the elements illustrated in FIG. 16. Alternatively, the electronic device 1000 may include less elements than the number of the elements illustrated in FIG. 16.

For example, as illustrated in FIG. 17, the electronic device 1000 according to an exemplary embodiment may further include a user input device 1100, an output device 1200, a sensor 1400, a communication interface 1500, an audio/video (A/V) input device 1600, and a memory 1700 in addition to the processor 1300.

The user input device 1100 may denote a means for inputting data which is used for a user to control the electronic device 1000. For example, the user input device 1100 may include a keypad, a dome switch, a touch pad (for example, a contact capacitive type, a press resistive type, an infrared sensing type, a surface ultrasound conductive type, an integration tension measurement type, and a piezo effect type), a jog wheel, and a jog switch, but is not limited thereto.

The output device 1200 may output an audio signal, a video signal, or a vibration signal. Also, the output device 1200 may include the display 1210, a sound output device 1220, and a vibration motor 1230.

The display 1210 may display information obtained through processing by the electronic device 1000. For example, the display 1210 may display an image on an electronic album, and a portion of the image corresponding to a main region may be displayed on the electronic album by the below-described processor 1300.

When the display 1210 forms a layer structure along with a touch pad and thus is configured with a touch screen, the display 1210 may be used as an input device in addition to an output device. The display 1210 may include at least one selected from a liquid crystal display (LCD), a thin film transistor-liquid crystal display, an organic light-emitting diode (OLED) display, a flexible display, a three-dimensional (3D) display, and an electrophoretic display. Also, the electronic device 1000 may include two or more displays 1210 depending on an implementation type of the electronic device 1000. In this case, the two or more displays 1210 may be disposed to face each other by using a hinge.

The sound output device 1220 may receive audio data received from the communication interface 1500 or stored in the memory 1700. Also, the sound output device 1220 may output a sound signal associated with a function performed by the electronic device 1000. The sound output device 1220 may include a speaker, a buzzer, and/or the like.

The vibration motor 1230 may output a vibration signal. For example, the vibration motor 1230 may output the vibration signal corresponding to an output of audio data or video data. Also, the vibration motor 1230 may output the vibration signal when a touch is applied to a touch screen.

The processor 1300 may control an overall operation of the electronic device 1000 to perform a function of the electronic device 1000 in FIGS. 1 to 15. For example, the processor 1300 may execute programs stored in the memory 1700 to overall control the user input device 1100, the output device 1200, the sensor 1400, the communication interface 1500, and the A/V input device 1600.

In detail, the processor 1300 may acquire block importance values of a plurality of blocks corresponding to an image. Each of the block importance values is a parameter value used to calculate an importance of each of the plurality of blocks corresponding to the image. A plurality of blocks corresponding to a portion of the image to be emphasized may be implemented in order for a block importance value to have a relatively higher value.

According to an exemplary embodiment, the processor 1300 may acquire a block importance value, based on the amount of information of each of a plurality of blocks. Here, a block importance value of one block may be proportional to the amount of information of the one block, and the amount of information of a block may be calculated from a configuration and a probability distribution of a pixel constituting the block. The amount of information of a block where pieces of color information of pixels are aligned may be lower than the amount of information of a block where pieces of color information of pixels are not aligned.

According to an exemplary embodiment, the processor 1300 may acquire a block importance value, based on a weight value based on a composition of an image. Here, a weight value may be set to have a highest value at a point where a virtual vertical line that horizontally divides a corresponding image into three equal parts intersects a virtual horizontal line that vertically divides the corresponding image into three equal parts.

According to an exemplary embodiment, the processor 1300 may recognize a face in an image and acquire a block importance value in the image, based on the recognized face.

According to an exemplary embodiment, the processor 1300 may acquire an importance map corresponding to the image, based on the acquired block importance value. Here, the importance map may have a plurality of regions respectively corresponding to the plurality of blocks corresponding to the image. A size of each of the plurality of regions included in the importance map may be equal to or larger than that of one pixel or that of at least one pixel. A shape of each of the regions may be polygonal such as square, rectangular, or the like.

According to an exemplary embodiment, the processor 1300 may map a block importance value of each of the blocks in a corresponding region of the importance map.

The processor 1300 may determine a reference region including at least one of the plurality of blocks corresponding to the image, based on a block importance value and a predetermined reference.

According to an exemplary embodiment, the processor 1300 may determine, as the reference region, a block having a highest block importance value and blocks which have a block importance value within a predetermined range from a block importance value of the block. A shape of the reference region may be polygonal such as square, rectangular, or the like.

According to an exemplary embodiment, the processor 1300 may recognize a face in the image to determine a reference region including at least one block corresponding to the recognized face in the image. The processor 1300 may determine the reference region in consideration of the above-described references, but is not limited thereto. For example, the reference region may be determined in consideration of various references.

The processor 1300 may determine a main region which includes the determined reference region and has a predetermined shape and size, based on the block importance value. A shape and a size of the main region may be predetermined by the processor 1300 or a user.

According to an exemplary embodiment, the processor 1300 may allow blocks, having a relatively higher block importance value among peripheral blocks of the reference region, to be preferentially added into the main region. A shape of the main region may be polygonal such as square, rectangular, or the like.

The processor 1300 may control the display 1210 to display a portion of the image corresponding to the main region.

As described above, an importance map may correspond to one image. A main region determined from the importance map may correspond to a certain portion of a corresponding image, and thus, the processor 1300 may control the display 1210 to display the certain portion. Therefore, even when a plurality of images are displayed, the user easily checks content included in each of the plurality of images.

According to an exemplary embodiment, the processor 1300 may map a certain portion of the image, corresponding to the determined main region, in the memory 1700 separately from the image. In this case, a resolution of the certain portion may be lower than that of the image, and the certain portion may function as a thumbnail image of the image.

According to an exemplary embodiment, the processor 1300 may enlarge the determined reference region, based on the block importance value. Here, the processor 1300 may enlarge the reference region, based on block importance values of peripheral blocks of the reference region (for example, block importance values of peripheral blocks located on upper, lower, left, and right sides of the reference region). For example, when the reference region includes one block, the processor 1300 may compare the block importance values of the peripheral blocks located on the upper, lower, left, and right sides of the reference region to enlarge the reference region to a block having a highest block importance value among the peripheral blocks.

According to an exemplary embodiment, when a reference region includes a plurality of regions, peripheral blocks of the reference region may be blocks which are located on one side of the reference region and share a border with the reference region. For example, when peripheral blocks of a reference region are two blocks located on one row, the peripheral blocks of the reference region may include two blocks located on a row on the reference region, two blocks located on a row under the reference region, two blocks located on the left of the reference region, and two blocks located on the right side of the reference region.

According to an exemplary embodiment, peripheral blocks may be blocks surrounding a reference region. For example, the peripheral blocks may be blocks which are located on an upper side, an upper right side, a right side, a right lower side, a lower side, a lower left side, a left side, and an upper left side of the reference region.

According to an exemplary embodiment, the processor 1300 may enlarge the reference region by using a maximum value of block importance values as a search value. The processor 1300 may compare a search value, which is a maximum value of block importance values in the importance map, with block importance values of peripheral blocks of a reference region, and when there is a block having a block importance value which is higher than the search value, the processor 1300 may enlarge the reference region to the block. For example, when there is no block having a block importance value which is equal to or higher than the search value, the processor 1300 may lower the search value and again compare the lowered search value with the block importance values of the peripheral blocks.

According to an exemplary embodiment, the processor 1300 may determine whether the enlarged reference region includes the main region. Determining whether an enlarged reference region includes a main region may denote determining whether a reference region is sufficiently enlarged and a shape and a size of the enlarged reference region are the same as those of the main region is determined, and in detail, may denote determining whether the reference region is enlarged to a degree to which the main region is included in the enlarged reference region.

According to an exemplary embodiment, when a shape of a predetermined main region is rectangular, the processor 1300 may compare a width and a height of the enlarged reference region with a width and a height of the main region to determine whether the enlarged reference region includes the main region.

According to an exemplary embodiment, when it is determined that the enlarged reference region includes the main region, the processor 1300 may determine the main region in the enlarged reference region.

When it is determined that the enlarged reference region does not include the main region, the processor 1300 may further enlarge the enlarged reference region, based on a block importance value.

According to an exemplary embodiment, the processor 1300 may preset a main region to have a shape congruent or similar to that of a cell. For example, when a ratio of a width to a height of the cell is 4:3, a shape of the main region may be previously set in order for a ratio of a width to a height of the main region to become 4:3.

According to an exemplary embodiment, the processor 1300 may enlarge or reduce a portion of the image corresponding to the main region to fit the cell and may display the enlarged or reduced portion. That is, since the main region has the shape congruent or similar to that of the cell and the portion of the image corresponding to the main region is enlarged or reduced to fit the cell, the image may be displayed on the cell in a state where the portion corresponding to the main region is not cut.

According to an exemplary embodiment, the processor 1300 may previously set a width of the main region, based on at least one selected from a ratio of a width of the image to a width of a cell constituting the electronic album and a ratio of a height of the image of to a height of the cell constituting the electronic album.

According to an exemplary embodiment, the processor 1300 may previously set a height of the main region, based on at least one selected from a ratio of a width of the image to a width of a cell constituting the electronic album and a ratio of a height of the image of to a height of the cell constituting the electronic album.

According to an exemplary embodiment, when the width of the image is W, a height of the image is H, the width of the cell is a, and the height of the cell is b, by using a small value "t" among w/a and h/b, the processor 1300 may previously set the main region, where a width is w*t and a height is h*t, in the importance map corresponding to the image.

The sensor 1400 may sense a state of the electronic device 1000 or an ambient state of the electronic device 1000 and transfer sensed information to the processor 1300.

The sensor 1400 may include at least one selected from a magnetic sensor 1410, an acceleration sensor 1420, a temperature/humidity sensor 1430, an infrared sensor 1440, a gyroscope sensor 1450, a position sensor (for example, a global positioning system (GPS)) 1460, a pressure sensor 1470, a proximity sensor 1480, and an RGB sensor (an illuminance sensor) 1490, but is not limited thereto. A function of each of the sensors may be intuitively inferred from a name of a corresponding sensor by one of ordinary skill in the art, and thus, its detailed description is not provided.

The communication interface 1500 may include one or more elements that enable the electronic device 1000 to communicate with an external device. For example, the communication interface 1500 may include a short-range communication interface 1510, a mobile communication interface 1520, and a broadcast receiver 1530.

The short-range communication interface 1510 may include a Bluetooth communication interface, a Bluetooth low energy (BLE) communication interface, a near field communication interface, a WLAN (Wi-Fi) communication interface, a Zigbee communication interface, an infrared data association (IrDA) communication interface, a Wi-Fi direct (WFD) communication interface, an ultra-wideband (UWB) communication interface, an Ant+ communication interface, and/or the like, but is not limited thereto.

The mobile communication interface 1520 may transmit or receive a wireless signal to or from at least one selected from a base station, an external terminal, and a server over a mobile communication network. Here, the wireless signal may include a voice call signal, a video call signal, or various types of data based on transmission/reception of a letter/multimedia message.

The broadcast receiver 1530 may receive a broadcast signal and/or broadcast-related information from the outside through a broadcast channel. The broadcast channel may include a satellite channel and a terrestrial channel. Depending on an implementation example, the electronic device 1000 may not include the broadcast receiver 1530.

Moreover, the communication interface 1500 may transmit or receive information for correcting a writing letter to or from an external device.

The A/V input device 1600 is for inputting an audio signal or a video signal and may include a camera 1610, a microphone 1620, and/or the like. The camera 1610 may obtain an image frame such as a still image or a moving image by using an image sensor in a video call mode or a photographing mode. An image captured by the image sensor may be processed by the processor 1300 or a separate image processor.

The image frame obtained by the camera 1610 may be stored in the memory 1700 or may be transmitted to the outside through the communication interface 1500. The camera 1610 may be provided as two or more depending on a configuration aspect of a terminal.

The microphone 1620 may receive and process an external sound signal to convert the external sound signal into electrical voice data. For example, the microphone 1620 may receive a sound signal from an external device or a talker. The microphone 1620 may use various noise removal algorithms for removing noise which occurs in the middle of receiving the external sound signal. The microphone 1620 may receive a voice response input of a user corresponding to question content provided by the processor 1300.

The memory 1700 may store a program for processing and control by the control 1300 or store data which is input to the electronic device 1000 or is output from the electronic device 1000.

The memory 1700 may include at least one type storage medium selected from a flash memory type, a hard disk type, a multimedia card micro type, a card type memory (for example, a micro-secure digital (SD) memory, an extreme digital (xD) memory, or the like), random access memory (RAM), static random access memory (SRAM), read-only memory (ROM), electrically erasable and programmable read-only memory (EEPROM), programmable read-only memory (PROM), a magnetic memory, a magnetic disk, and an optical disk.

The programs stored in the memory 1700 may be classified into a plurality of modules depending on functions. For example, the programs may be classified into a user interface (UI) module 1710, a touch screen module 1720, a notification module 1730, and/or the like.

The UI module 1710 may provide a UI, a graphic UI (GUI), and/or the like cooperating with the electronic device 1700 for each of a plurality of applications. The touch screen module 1720 may sense a touch gesture of a user applied to the touch screen and transfer information about the touch gesture to the processor 1300. The touch screen module 1720 according to an exemplary embodiment may recognize and analyze a touch code. The touch screen module 1720 may be configured with separate hardware including a controller.

Various sensors may be provided inside or near a touch screen, for detecting a touch or a proximity touch applied to the touch screen. An example of a sensor for sensing a touch input applied to the touch screen is a tactile sensor. The tactile sensor denotes a sensor that senses a touch by a specific object by a degree, in which a user feels, or more. The tactile sensor may sense various pieces of information such as a roughness of a touched surface, a stiffness of a touched object, a temperature of a touched point, etc.

Moreover, an example of a sensor for sensing a touch of the touch screen is a proximity sensor.

The proximity sensor denotes a sensor that detects an object approaching a detection surface or an object near the detection surface by using an electromagnetic force or infrared light without any mechanical contact. Examples of the proximity sensor include a transmissive photosensor, a directly reflective photosensor, a mirror reflective photosensor, a high frequency oscillation-type proximity sensor, a capacitive proximity sensor, a magnetic proximity sensor, an infrared proximity sensor, and/or the like. Examples of a user's touch gesture may include a tap, a touch and hold, a double tap, a drag, panning, a flick, a drag and drop, a swipe, and/or the like.

The notification module 1730 may generate a signal for notifying an event that occurs in the electronic device 1000. Examples of the event occurring in the electronic device 1000 may include reception of a call signal, reception of a message, an input of a key signal, notification of a schedule, and/or the like. The notification module 1730 may output a notification signal in the form of video signals through the display 1210, output the notification signal in the form of audio signals through the sound output device 1220, and output the notification signal in the form of vibration signals by using the vibration motor 1230.

Moreover, some or all of the elements of the electronic device 1000 illustrated in FIGS. 16 and 17 may be implemented by at least one hardware processor. For example, writing data input to the electronic device 1000 may be acquired through a separate processor in addition to a main processor of the electronic device 1000.

Moreover, some of the elements of the electronic device 1000 illustrated in FIGS. 16 and 17 may be implemented by at least one software processor. For example, some functions of the electronic device 1000 may be implemented by an operating system (OS) program, and the other some functions may be implemented by an application program. Therefore, functions of the electronic device 1000 may be implemented by at least one piece of hardware and at least one piece of software, and functions of the electronic device 1000 implemented by software may be executed by an OS and an application which are installed in the electronic device 1000.

The electronic device 1000 according to an exemplary embodiment may include a processor, a memory storing and executing program data, a permanent storage such as a disk drive, a communication port for communication with an external device, a user interface device such as a touch panel, keys or buttons, and the like. Methods embodied as a software module or an algorithm may be stored on a non-transitory computer-readable recording medium as computer readable codes or program commands executable by the processor. Examples of the non-transitory computer-readable recording medium include magnetic storage media (e.g., ROM, floppy disks, hard disks, etc.), optical recording media (e.g., CD-ROMs, or DVDs), and the like. The non-transitory computer-readable recording medium may also be distributed over network-coupled computer systems so that the computer readable code is stored and executed in a distributed fashion. The medium may be read by a computer, stored in a memory, and executed by the processor.

Reference numerals are used in the exemplary embodiments shown in the drawings, and specific terms are used to explain the exemplary embodiments; however, they are not intended to limit the present disclosure and may represent all the components that could be considered by those of ordinary skill in the art.

Exemplary embodiments may be embodied as functional blocks and various processing operations. The functional blocks may be implemented with various hardware and/or software configurations executing specific functions. For example, exemplary embodiments employ integrated circuit configurations such as a memory, processing, logic, a look-up table and the like capable of executing various functions upon control of microprocessors or other control devices. In a similar manner to that in which the elements of the present disclosure may be executed with software programming or software elements, exemplary embodiments may be implemented with a scripting language or a programming language such as C, C++, Java, assembler, and the like, including various algorithms implemented by a combination of data structures, processes, processes, routines or other programming configurations. The functional aspects may be implemented by algorithms executed in one or more processors. Also, exemplary embodiments may employ conversional arts to establish an electronic environment, process signals and/or process data. The terms "mechanism", "element", "means" and "configuration" may be widely used and are not limited to mechanical and physical configurations. Such terms may have the meaning of a series of routines of software in association with a processor or the like.

Specific executions described herein are merely examples and do not limit the scope of the inventive concept in any way. For simplicity of description, other functional aspects of conventional electronic configurations, control systems, software and the systems may be omitted. Furthermore, line connections or connection members between elements depicted in the drawings represent functional connections and/or physical or circuit connections by way of example, and in actual applications, they may be replaced or embodied as various additional functional connection, physical connection or circuit connections. Also, the described elements are not required elements for the application of the inventive concept unless they are specifically mentioned as being "essential" or "critical."

The singular forms "a," "an," and "the" include the plural forms as well, unless otherwise noted. The ranges defined herein are intended to include anything in which values within the range are individually applied and may be considered to be the same as individual values constituting the range in the present disclosure. Operations constituting the method of exemplary embodiments may be performed in any order unless explicitly described in terms of order or described to the contrary. Exemplary embodiments are not necessarily limited to the order of operations given in the description. The examples or exemplary terms (e.g., for example, etc.) used herein are to describe exemplary embodiments in detail and are not intended to limit the present disclosure. Also, those of ordinary skill in the art should appreciate that many alternation, combination and modifications, may be made according to design conditions and factors within the scope of the appended claims and their equivalents.

It should be understood that exemplary embodiments described herein should be considered in a descriptive sense only and not for purposes of limitation. Descriptions of features or aspects within each exemplary embodiment should be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. An image display method performed by an electronic device, the image display method comprising:
    acquiring block importance values of a plurality of blocks corresponding to an image;
    determining a reference region including at least one block among the plurality of blocks based on the acquired block importance values and a predetermined reference;
    enlarging a size of the determined reference region based on the block importance values to determine a main region having a predetermined shape and a predetermined size in the enlarged reference region; and
    displaying a portion of the image corresponding to the main region.

2. The image display method of claim 1, wherein the acquiring the block importance values comprises generating an importance map corresponding to the image based on the block importance values,
    the reference region is determined in the importance map based on the block importance values and the predetermined reference, and
    the main region is determined in the importance map based on the block importance values.

3. The image display method of claim 1, wherein each of the block importance values is acquired based on an amount of information of a corresponding block among the plurality of blocks.

4. The image display method of claim 3, wherein the amount of information is determined based on weight values of points in the image based on a composition of the image.

5. The image display method of claim 4, wherein weight values of a plurality of intersection points in the image, where a plurality of virtual vertical lines that horizontally divide the image intersect a plurality of virtual horizontal lines that vertically divide the image, are higher than weight values of other points in the image.

6. The image display method of claim 5, wherein weight values of points included among the intersection points are equal.

7. The image display method of claim 4, wherein a weight value of a center point in the image is higher than a weight value of other points in the image.

8. The image display method of claim 1, wherein the acquiring the block importance values comprises recognizing a face in the image, and
    a block importance value of a portion in which the face is recognized in the image is higher than a block importance value of a portion in which the face is not recognized in the image.

9. The image display method of claim 1, wherein a block importance value of the at least one block included in the reference region is higher than block importance values of blocks that are not included in the reference region.

10. The image display method of claim 1, wherein the determining the reference region comprises recognizing a face in the image, and
    the reference region comprises at least one block corresponding to a portion in which the face is recognized in the image.

11. The image display method of claim 1, wherein the determining the main region comprises:
    determining whether the enlarged reference region covers the main region; and
    in response to determining that the enlarged reference region covers the main region, determining the main region in the enlarged reference region.

12. The image display method of claim 11, wherein the main region is preset to have a rectangular shape, and
    the determining whether the enlarged reference region covers the main region comprises comparing a width and a height of the enlarged reference region with a width and a height of the main region.

13. The image display method of claim 12, wherein a portion of the image corresponding to the main region is displayed on an electronic album, and
    the width of the main region is preset based on at least one selected from a ratio of a width of the image to a width of a cell constituting the electronic album and a ratio of a height of the image of to a height of the cell constituting the electronic album.

14. The image display method of claim 11, wherein when a maximum width of the main region is equal to a width of the image, the reference region is determined to have the same width as the maximum width of the main region, and
    the determined reference region is enlarged in a horizontal direction based on the block importance values.

15. The image display method of claim 12, wherein a portion of the image corresponding to the main region is displayed on an electronic album, and
    a height of the main region is preset based on at least one selected from a ratio of a width of the image to a width of a cell constituting the electronic album and a ratio of a height of the image of to a height of the cell constituting the electronic album.

16. The image display method of claim 11, wherein when a maximum height of the main region is equal to a height of the image, the reference region is determined to have the same height as the maximum height of the main region, and
 the determined reference region is enlarged in a vertical direction based on the block importance values.

17. The image display method of claim 1, wherein a portion of the image corresponding to the main region is displayed on an electronic album, and
 the main region is preset to have a shape that is congruent to a shape of a cell constituting the electronic album.

18. The image display method of claim 17, wherein the portion of the image corresponding to the main region is enlarged or reduced to fit the cell.

19. An electronic device for displaying an image, the electronic device comprising:
 at least one processor configured to acquire block importance values of a plurality of blocks corresponding to an image, determine a reference region including at least one block among the plurality of blocks based on the acquired block importance values and a predetermined reference, and enlarge a size of the determined reference region based on the block importance values to determine a main region having a predetermined shape and a predetermined size in the enlarged reference region; and
 a display configured to display a portion of the image corresponding to the main region.

20. The electronic device of claim 19, wherein the at least one processor is further configured to generate an importance map corresponding to the image, based on the block importance values,
 the reference region is determined in the importance map, based on the block importance values and the predetermined reference, and
 the main region is determined in the importance map, based on the block importance values.

21. The electronic device of claim 19, wherein each of the block importance values is acquired based on an amount of information of a corresponding block among the plurality of blocks.

22. The electronic device of claim 19, wherein the at least one processor is further configured to recognize a face in the image, and
 a block importance value of a portion in which the face is recognized in the image is higher than a block importance value of a portion in which the face is not recognized in the image.

23. The electronic device of claim 19, wherein a block importance value of the at least one block included in the reference region is higher than block importance values of blocks that are not included in the reference region.

24. The electronic device of claim 19, wherein the at least one processor is further configured to recognize a face in the image, and
 the reference region comprises at least one block corresponding to a portion in which the face is recognized in the image.

25. The electronic device of claim 19, wherein the at least one processor is further configured to determine whether the enlarged reference region covers the main region, and determine the main region in the enlarged reference region in response to determining that the enlarged reference region covers the main region.

26. The electronic device of claim 19, wherein a portion of the image corresponding to the main region is displayed on an electronic album, and
 the main region is preset to have a shape that is congruent to a shape of a cell constituting the electronic album.

27. A non-transitory computer-readable recording medium having recorded thereon a program for executing, by a computer, the image display method of claim 1.

* * * * *